United States Patent
Lee et al.

(10) Patent No.: US 10,481,339 B2
(45) Date of Patent: Nov. 19, 2019

(54) HIGH AVERAGE POWER OPTICAL FIBER CLADDING MODE STRIPPER, METHODS OF MAKING AND USES

(71) Applicant: Foro Energy, Inc., Littleton, CO (US)

(72) Inventors: Ian Lee, Highlands Ranch, CO (US); Andrey Kuznetsov, Highlands Ranch, CO (US); Brian O. Faircloth, Evergreen, CO (US)

(73) Assignee: Foro Energy, Inc., Houston, TX (US)

( * ) Notice: Subject to any disclaimer, the term of this patent is extended or adjusted under 35 U.S.C. 154(b) by 7 days.

(21) Appl. No.: 15/788,752

(22) Filed: Oct. 19, 2017

(65) Prior Publication Data

US 2018/0045895 A1  Feb. 15, 2018

Related U.S. Application Data

(60) Continuation-in-part of application No. 15/147,269, filed on May 5, 2016, now Pat. No. 10,042,123, which is a division of application No. 13/486,795, filed on Jun. 1, 2012, now Pat. No. 9,360,643.

(60) Provisional application No. 62/410,724, filed on Oct. 20, 2016, provisional application No. 61/605,413, filed on Mar. 1, 2012, provisional application No. 61/493,174, filed on Jun. 3, 2011.

(51) Int. Cl.
| | |
|---|---|
| G02B 6/38 | (2006.01) |
| G02B 6/42 | (2006.01) |
| G02B 6/44 | (2006.01) |
| G02B 6/14 | (2006.01) |
| H01S 3/00 | (2006.01) |

(52) U.S. Cl.
CPC ............. *G02B 6/3813* (2013.01); *G02B 6/14* (2013.01); *G02B 6/3814* (2013.01); *G02B 6/3818* (2013.01); *G02B 6/4296* (2013.01); *G02B 6/4427* (2013.01); *G02B 2006/4297* (2013.01); *H01S 3/0064* (2013.01)

(58) Field of Classification Search
CPC . G02B 6/14; G02B 6/262; G02B 6/34; G02B 6/3624; G02B 6/3813; G02B 6/3814; G02B 6/3818; G02B 6/42; G02B 6/4201; G02B 6/4296; G02B 6/4427; H01S 3/0405; H01S 3/0064
USPC ......... 385/27–28, 31, 33, 38, 39, 78, 88–94, 385/123; 372/6
See application file for complete search history.

(56) References Cited

U.S. PATENT DOCUMENTS

| | | | |
|---|---|---|---|
| 4,997,250 | A | 3/1991 | Ortiz |
| 8,511,401 | B2 | 8/2013 | Zediker et al. |
| 8,571,368 | B2 | 10/2013 | Rinzler et al. |
| 8,826,973 | B2 | 9/2014 | Moxley et al. |
| 9,242,309 | B2 | 1/2016 | Zediker et al. |
| 9,244,235 | B2 | 1/2016 | Norton et al. |

(Continued)

OTHER PUBLICATIONS

PCT Search report and opinioin in PCT/US2017/057442, dated Feb. 12, 2018, ISA/US.

*Primary Examiner* — Michael P Mooney
(74) *Attorney, Agent, or Firm* — Glen P. Belvis; Belvis Law, LLC.

(57) ABSTRACT

Nano-particle based mode strippers for removing undesirable laser energy for laser systems. Nano-particle mode strippers having matched indices of refraction to the outer cladding remove cladding light converting it into heat. There are provided fibers having evanescent mode strippers having annular outer cores and claddings.

21 Claims, 21 Drawing Sheets

(56) References Cited

U.S. PATENT DOCUMENTS

| | | |
|---|---|---|
| 9,435,945 B2 * | 9/2016 | Gapontsev .............. G02B 6/036 |
| 2006/0065815 A1 | 3/2006 | Jurca |
| 2009/0294050 A1 | 12/2009 | Traggis |
| 2009/0308852 A1 | 12/2009 | Alpay |
| 2011/0110625 A1 | 5/2011 | Chatigny |
| 2013/0011102 A1 | 1/2013 | Rinzler |
| 2015/0260911 A1 * | 9/2015 | Ilyashenko ........ G02B 6/02052 372/6 |
| 2016/0291256 A1 | 10/2016 | Rollinger |

* cited by examiner

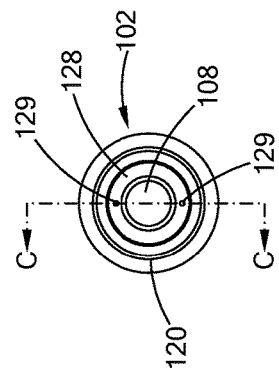
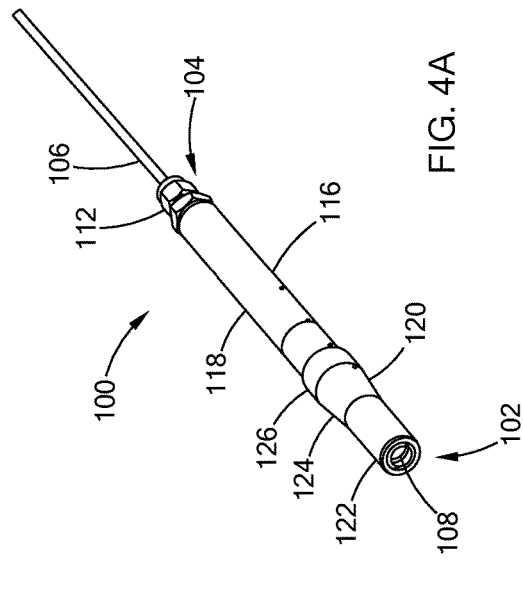
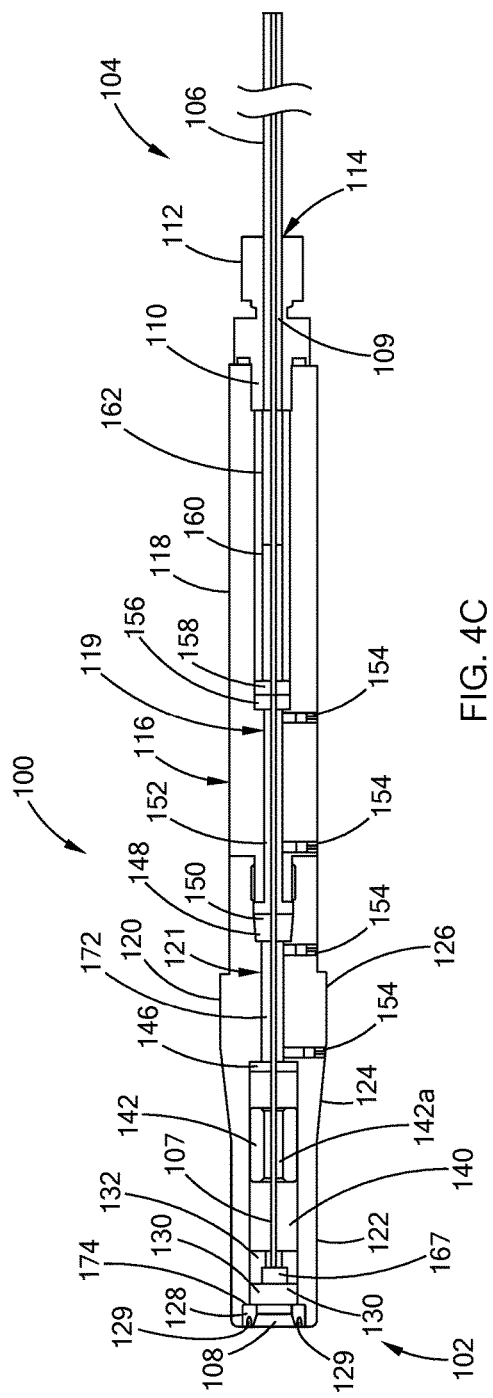

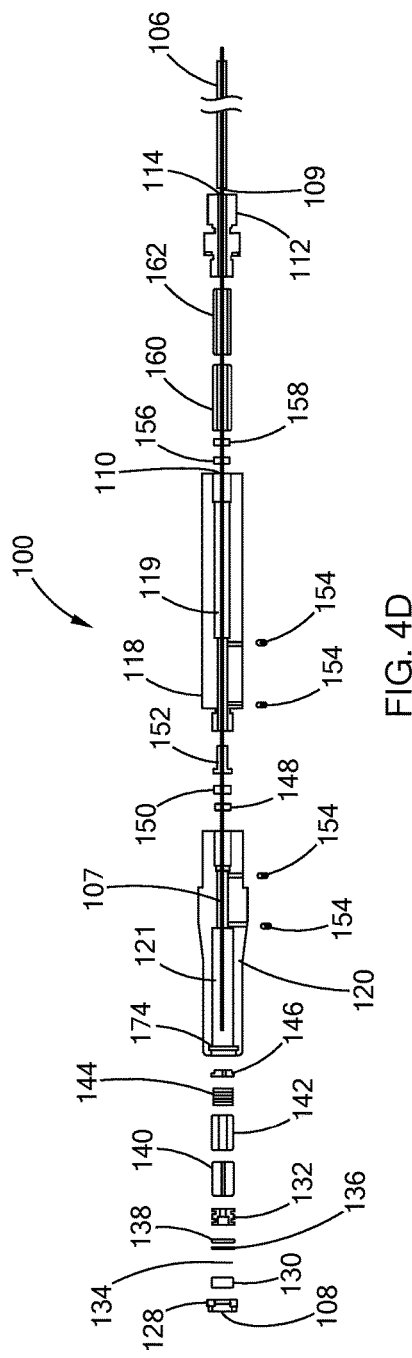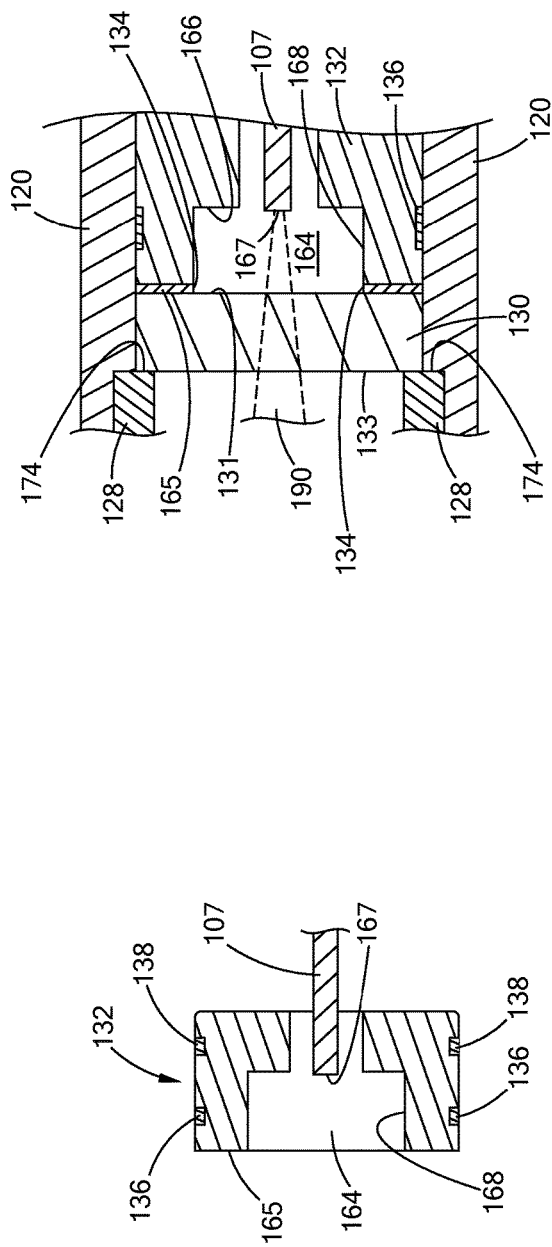

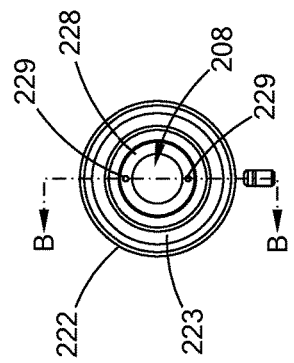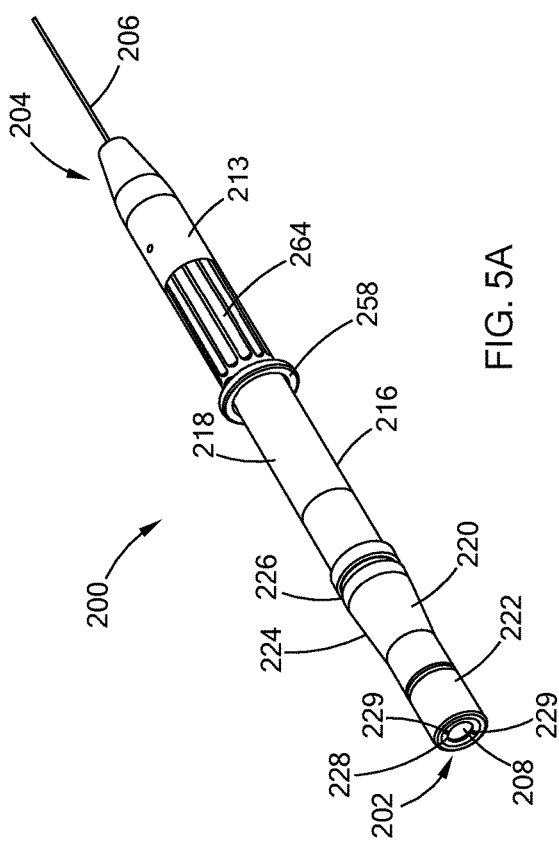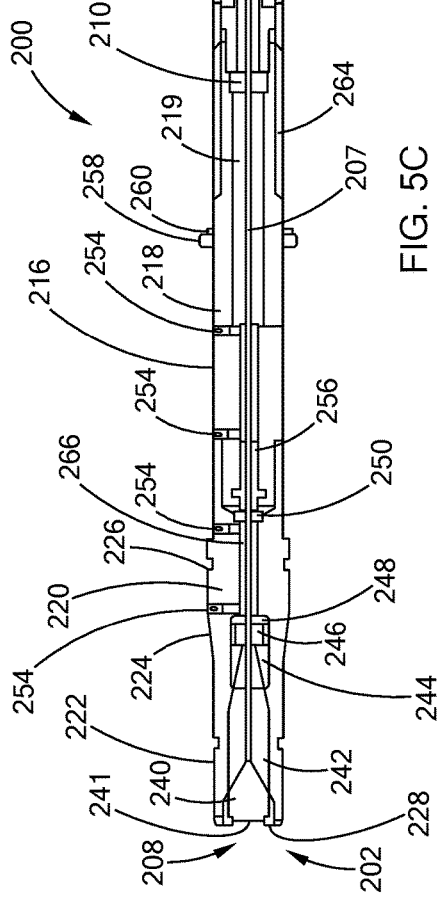

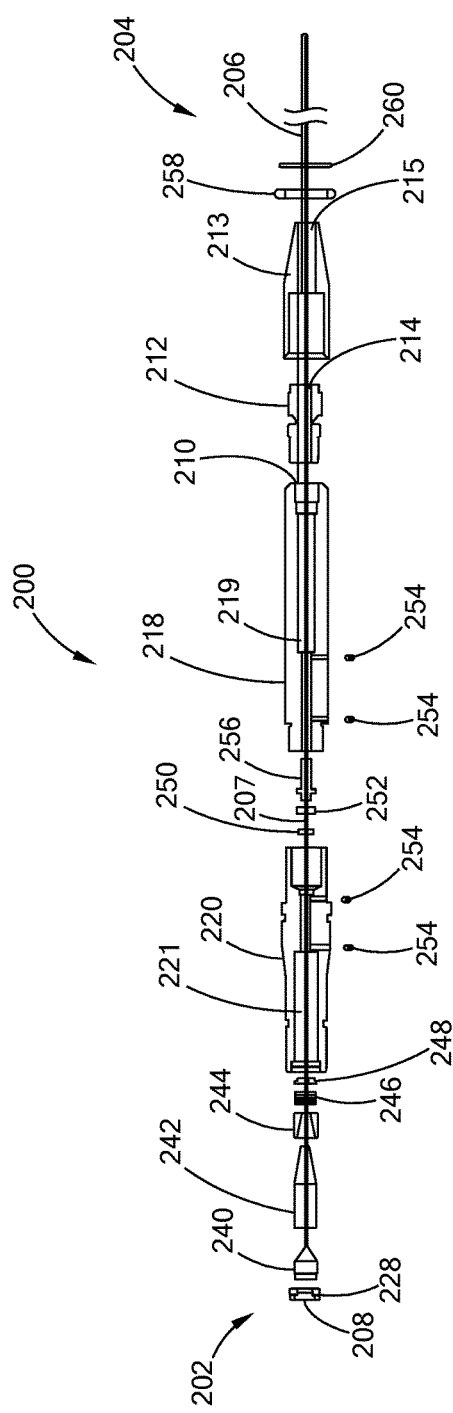
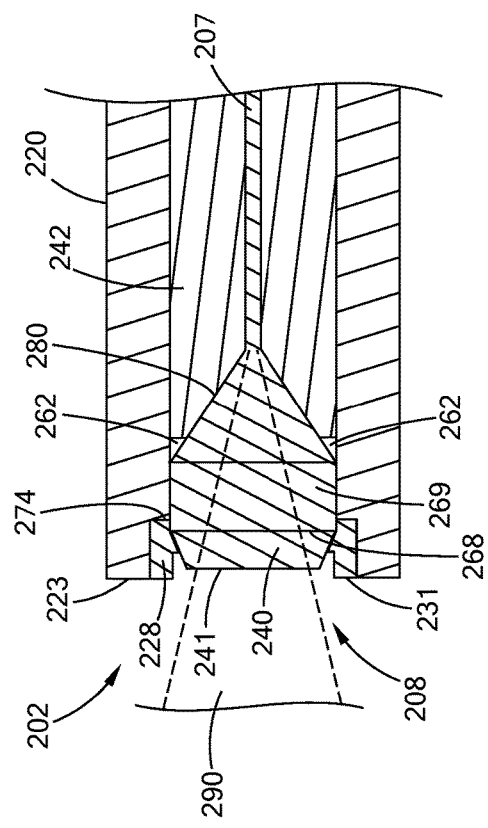
FIG. 5D
FIG. 5E

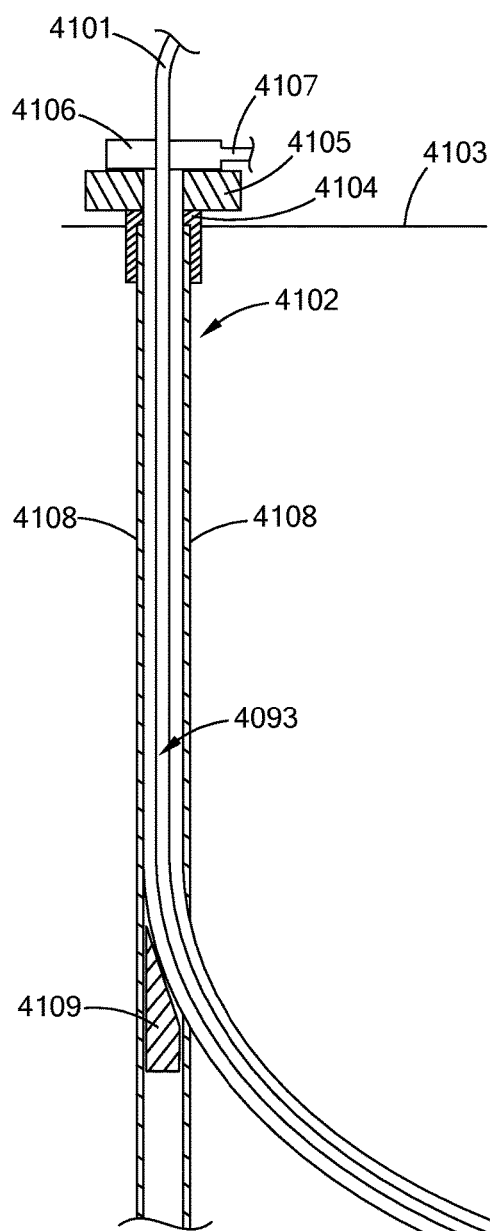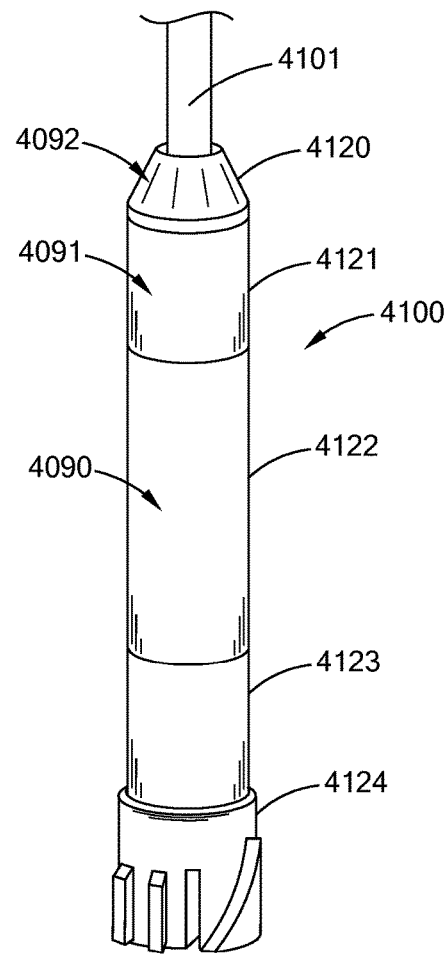
FIG. 11
FIG. 11A

HIGH AVERAGE POWER OPTICAL FIBER CLADDING MODE STRIPPER, METHODS OF MAKING AND USES This application:

(i) claims under 35 U.S.C. § 119(e)(1), the benefit of filing of provisional patent application Ser. No. 62/410,724 filed Oct. 20, 2016; and, (ii) is a continuation-in-part of U.S. patent application Ser. No. 15/147,269, filed May 5, 2016, which is a divisional of U.S. patent application Ser. No. 13/486,795 filed Jun. 1, 2012, now U.S. Pat. No. 9,360,643, and which claims under 35 U.S.C. § 119(e)(1), the benefit of filing of provisional patent application Ser. No. 61/605,413 filed Mar. 1, 2012 and Ser. No. 61/493,174 filed Jun. 3, 2011;

the entire disclosures of each of which are incorporated herein by reference.

BACKGROUND OF THE INVENTION

Field of the Invention

The present inventions relate to high power laser systems, high power laser fibers for the delivery of high power laser energy to nearby, as well as, remote and difficult to access locations, high power laser tools, and other high power laser systems and applications, and in particular to methods, apparatus and systems for managing and controlling undesirable or detrimental laser propagations, such as cladding transmissions, cladding modes and back reflections.

As used herein, unless specified otherwise, the terms "high power" and "high power laser energy" and similar such terms mean a laser beam having at least about 1 kW (kilowatt) of power. As used herein, unless specified otherwise, the term "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein, unless specified otherwise, the term "substantial power transmission" means at least about 50% transmittance.

As used herein, unless specified otherwise, the terms "passive cooling," "passively cooled" and similar such terms mean any type of cooling that does not employ or use an additional system, material, component or equipment to cool the assembly; but instead relies only on the operating environment and conditions to manage and to the extent needed to cool any heat generated by the high power laser energy during operations.

As used herein, unless specified otherwise, the terms "forward moving", "forward", "forward propagation" and similar such terms are to be given their broadest meanings, and in general mean moving away from the primary laser source, i.e., the high power laser, and toward the distal end of the optical fiber, system or tool. Typically, a direction of travel from proximal end to distal end.

As used herein, unless specified otherwise, the terms "backward" "backward moving" and "backward propagation" are to be given their broadest meaning, and in general mean moving away from the target or distal end of a fiber, system or tool toward the primary laser. Typically, a direction of travel that is from the distal end to the proximal end. "Back reflections" typically can be backward propagating, however, they can also include light scattered in other directions.

As used herein, unless specified otherwise, the term "borehole" should be given it broadest possible meaning and includes any opening that is created in a material, a work piece, a surface, the earth, a structure (e.g., building, protected military installation, nuclear plant, offshore platform, or ship), or in a structure in the ground, (e.g., foundation, roadway, airstrip, cave or subterranean structure) that is substantially longer than it is wide, such as a well, a well bore, a well hole, a micro hole, slimhole and other terms commonly used or known in the arts to define these types of narrow long passages. Wells would further include exploratory, production, abandoned, reentered, reworked, and injection wells. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°, i.e., horizontal and greater than 90° e.g., such as a heel and toe, and combinations of these such as for example "U" and "Y" shapes. Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. Unless specified otherwise, the terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages and combinations thereof, in a situation where multiple boreholes are connected or interconnected each borehole would have a borehole bottom. Boreholes may be formed in the sea floor, under bodies of water, on land, in ice formations, or in other locations and settings.

As used herein, unless specified otherwise, the term "advancing" a borehole should be given its broadest possible meaning and includes increasing the length of the borehole. Thus, by advancing a borehole, provided the orientation is less than 90° the depth of the borehole may also increase. The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the terms "decommissioning," "plugging" and "abandoning" and similar such terms should be given their broadest possible meanings and would include activities relating to the cutting and removal of casing and other tubulars from a well (above the surface of the earth, below the surface of the earth and both), modification or removal of structures, apparatus, and equipment from a site to return the site to a prescribed condition, the modification or removal of structures, apparatus, and equipment that would render such items in a prescribe inoperable condition, the modification or removal of structures, apparatus, and equipment to meet environmental, regulatory, or safety considerations present at the end of such items useful, economical or intended life cycle. Such activities would include for example the removal of onshore, e.g., land based, structures above the earth, below the earth and combinations of these, such as e.g., the removal of tubulars from within a well in preparation for plugging. The removal of land based tubulars at the surface of the earth, below the surface of the earth, less than 20 feet below the surface of the earth, and combinations and variations of these. The land based tubulars, would include for example, conductors and casing. The removal of offshore structures above the surface of a body of water, below the surface, and below the seafloor and combinations of these, such as fixed drilling platforms, the removal of conductors, the removal of tubulars from within a well in preparation for plugging, the removal of structures within the earth, such as a section of a conductor that is located below the seafloor and combinations of these.

As used herein, unless specified otherwise, the terms "workover," "completion" and "workover and completion" and similar such terms should be given their broadest possible meanings and would include activities that place at or near the completion of drilling a well, activities that take place at or the near the commencement of production from the well, activities that take place on the well when the well is producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, desiccate and combinations and variations of these, materials in a well, or other structure, to remove, assist in their removal, cleanout, condition and combinations and variation of these, such materials.

Generally, the term "about" as used herein unless stated otherwise is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

In transmitting high power laser energy and in performing high power laser operations, such as monitoring, welding, cladding, annealing, heating, cleaning, cutting, etching, and drilling, and in both operations and activities, the creation and propagation of undesirable laser energy can occur. This undesirable laser energy, and in many cases and in particular as laser powers increase, has the potential to become detrimental, damaging, and potentially dangerous. This undesirable laser energy typically is in the form of cladding transmissions, either forward or backward transmissions, from elements, such as, splices, optics, bends (macro and micro in the fiber), temperature, connectors, and work or target surfaces. This undesirable laser energy can enter into one or more of the optical fiber's cladding layers. Once in the cladding this undesirable laser energy can become contained, trapper or propagated by one or more of the cladding layers, or can escape the cladding layer damaging the system. While detection systems can mitigate the dangers from these undesirable laser energies, they typically have the result of shutting down the system and operations, can at times fail to prevent damage to internal components of the laser system, and provide no ability to remove these undesirable laser energies from the system, without disrupting, interrupting or otherwise shutting down the system's operation. Thus, there has been a long standing, growing and unfulfilled need to remove undesirable laser energies, such as cladding transmissions, cladding modes, and back reflections, while not disrupting the laser system's operations. The present inventions, among other things, solve these needs by providing the articles of manufacture, devices and processes taught and disclosed herein.

Thus there is provided a high power laser mode stripper in optical communication with an optical fiber and in thermal communication with a heat sink, the mode stripper comprising: a carrier medium; the carrier medium being in direct physical contact and in optical contact with a cladding layer of an optical fiber; the carrier medium having an index of refraction and the outer cladding having an index of refraction; wherein the carrier medium index of refraction is matched to the cladding index of refraction, whereby light from the cladding will propagate into the carrier medium; the carrier medium holding a distribution of nano-particles, whereby the distribution of nano-particles is configured to effect the light propagated from the cladding into the carrier medium; and, the carrier medium is in thermal contact with a heat sink; whereby upon propagation of light from the cladding to the carrier medium, the nano-particles and carrier medium convert the light propagated from the cladding into heat which is transmitted by the carrier medium to the heat sink.

In deterring the respective refractive index difference between the cladding layer and the stripping layer (i.e., the carrier medium with nano-particles) the index different should be such as to control the amount of heat that is generated. Thus, if the difference is too small, an excessive amount of localized heating could occur, which in some embodiments could damage the components. In this manner, the amount of nano-particles can be controlled in a predetermined manner to provide a predetermined difference in the refractive index; and in turn, a predetermined amount of heat generated from the laser power that is stripped from the cladding. In embodiments, the concentration or amount of nano-particles to carrier medium can be in the range of from 50:50 (nano-particle:carrier medium) to 10:90 (nano-particle:carrier medium), greater and smaller ratios are also contemplated.

In embodiments, the use of the present mode strippers can provide improvement in NA of the fiber at the distal or launch end of the fiber, by controlling the cladding loss. Generally, in embodiments of the present mode strippers, the mix of NA from core and cladding light is reduced or eliminated to allow only the NA from the core light propagation. Thus, for example, embodiments of the present mode strippers provide a reduction from 0.23 or 0.24 NA to values of 0.19 NA or less for a 0.22 NA fiber of >150 m length.

Additionally, there is provided, these mode strippers, methods and systems having one or more of the following features: wherein the indices of refraction are matched to within about 5% of each other; wherein the indices of refraction are matched to within about 2% of each other; wherein the indices of refraction are matched to within about 1% of each other; wherein the indices of refraction are matched to within about 0.1% of each other; wherein the indices of refraction are the same; wherein the carrier medium is selected from the group consisting of sodium silicate, fused silica, and spinel; wherein the nano-particles have a D50 particle size of about 100 nm to 2000 nm; wherein the nano-particles have a D50 particle size of about 10 nm to 2000 nm; wherein the nano-particles are selected from the group consisting of silica, diamond, spinel, sapphire, and borosilicate glass; wherein the effect on the light propagated from the cladding to the carrier material comprises scattering; and, wherein the effect on the light propagated from the cladding to the carrier material comprises absorption.

Still further there is provide a method of forming a mode stripper on an optical fiber, the method comprising: providing an outer surface of a cladding layer of an optical fiber having a core; applying a composition to the outer surface; the composition having a transparent liquid medium having a dispersion of nano-particles; solidifying the transparent liquid medium to form a solid layer of dispersed nano-particles, the solidified layer of medium having a predetermined index of refraction; and, placing the solid layer of dispersed nano-particles in thermal contact with a heat sink.

Moreover, there is provided, these mode strippers, methods and systems having one or more of the following features: wherein there is abrading of the outer surface of the option fiber before applying the composition; wherein the indices of refraction are matched to within about 5% to about 1% of each other; wherein the indices of refraction are matched to within about 1% to about 0.1% of each other; and wherein the nano-particles have a D50 particle size of about 100 nm to 2000 nm.

Still further there is provided a high power laser mode stripper in optical communication with an optical fiber and in thermal communication with a heat sink, the mode stripper comprising: a carrier medium; the carrier medium being in direct physical contact and in optical contact with a cladding layer of an optical fiber; the carrier medium having an index of refraction and the outer cladding having an index of refraction; wherein the carrier medium index of refraction is matched to the cladding index of refraction, whereby light from the cladding will propagate into the carrier medium; the carrier medium holding a distribution of nano-particles, whereby the distribution of nano-particles is capable of absorbing and scattering the light propagated from the cladding into the carrier medium; and, the carrier medium is in thermal contact with a heat sink; whereby the nano-particles are capable of converting the light propagated from the cladding to the carrier medium to heat which is transmitted to the heat sink.

Yet additionally, there is provided, these mode strippers, methods and systems having one or more of the following features: wherein at least about 50% of the light propagated from the cladding into the carrier medium is scattered by the nano-particles; wherein at least about 80% of the light propagated from the cladding into the carrier medium is scattered by the nano-particle; wherein about 5% to about 20% of the light propagated from the cladding into the carrier medium is absorbed by the nano-particles; wherein at least about 90% of the light propagated from the cladding into the carrier medium is scattered by the nano-particles; wherein the nano-particles have a particle size of about 100 nm to about 2000 nm; wherein the nano-particles have a particle size of about 500 nm to about 1500 nm; and wherein the nano-particles have a particle size of about 2000 nm and smaller.

In addition there is provided a high power laser fiber defining a length having a distance, the fiber comprising: a core, an inner cladding surrounding the core and in optical communication with the core, and an evanescent mode stripper; wherein the evanescent mode stripper has: an outer annular core in optical communication with the inner cladding; an outer cladding in physical contact and optical communication with the annular core; and a mode stripping medium in optical and physical communication with the outer cladding; whereby upon propagation of cladding modes the cladding modes are stripped from the fiber and converted to heat by the mode stripping medium.

Additionally, there is provided, these mode strippers, methods and systems having one or more of the following features: wherein the evanescent mode stripper is at least 10% of the length of the fiber; wherein the evanescent mode stripper is at least 20% of the length of the fiber; wherein the fiber is about 1 m to about 2 km in length; wherein the length of the fiber is not shorter than 50 m; wherein the length is not shorter than 500 m; wherein the distance is not shorter than 1000 m; wherein the distance is from about 1 m to about 2 km; wherein the distance is about 30 m to about 100 m; wherein the mode stripper material is acrylate; and wherein the mode stripper material is a high temperature acrylate.

Still further there is provided a laser system for use in oil field laser operations, the system comprising: a high power laser for providing a high power laser beam; a high power transmission optical fiber in optical communication with the high power laser and a laser tool; whereby the high power laser beam is transmitted through the transmission optical fiber; and, a mode stripper in optical communication with at least a portion of the transmission optical fiber; wherein the mode stripper is selected from the group consisting of a distributed nano-particle mode stripper and an evanescent mode stripper; whereby the only light propagated by the transmission optical fiber after passing through the mode stripper is located in a central core of the fiber.

Moreover, there is provided, these mode strippers, methods and systems having one or more of the following features: wherein the laser system is selected from the group consisting of a drilling system, a decommissioning system, and an off shore laser system.

Furthermore, there is provided a laser system for use in oil field laser operations, the system comprising: high power laser for providing a high power laser beam; a high power transmission optical fiber in optical communication with the high power laser tool; whereby the high power laser beam is transmitted by the transmission optical fiber and laser tool and delivered to a work surface to perform a laser operation; and, a mode stripper in optical communication with the transmission optical fiber, an optical component within the laser tool or both; wherein the mode stripper is selected from the group consisting of a distributed nano-particle mode stripper and an evanescent mode stripper.

BRIEF DESCRIPTION OF THE DRAWINGS

FIG. 4A is a perspective view of a first embodiment of a connector having a mode stripper in accordance with the present invention.

FIG. 4B is a plan view of the face end of the embodiment of FIG. 4A.

FIG. 4C is a cross-sectional view of the embodiment of FIG. 4A taken along line C-C of FIG. 4B.

FIG. 4D is an exploded view of the embodiment of FIG. 4A.

FIG. 4E is a cross-sectional view of the front end of the embodiment of FIG. 4A.

FIG. 4F is an enlarged cross-section view of the front end of FIG. 4E.

FIG. 5A is a perspective view of a second embodiment of a connector having a mode stripper in accordance with the present invention.

FIG. 5B is a plan view of the face end of the embodiment of FIG. 5A.

FIG. 5C is a cross-sectional view of the embodiment of FIG. 5A taken along line B-B of FIG. 5B.

FIG. 5D is an exploded view of the embodiment of FIG. 5A.

FIG. 5E is a cross-sectional view of the front end of the embodiment of FIG. 5A.

FIG. 11 is a perspective view of an embodiment of a deployed laser tool having a mode stripper in accordance with the present inventions.

FIG. 11A is a perspective view of the tool of FIG. 11.

DESCRIPTION OF THE PREFERRED EMBODIMENTS

Figure 1:
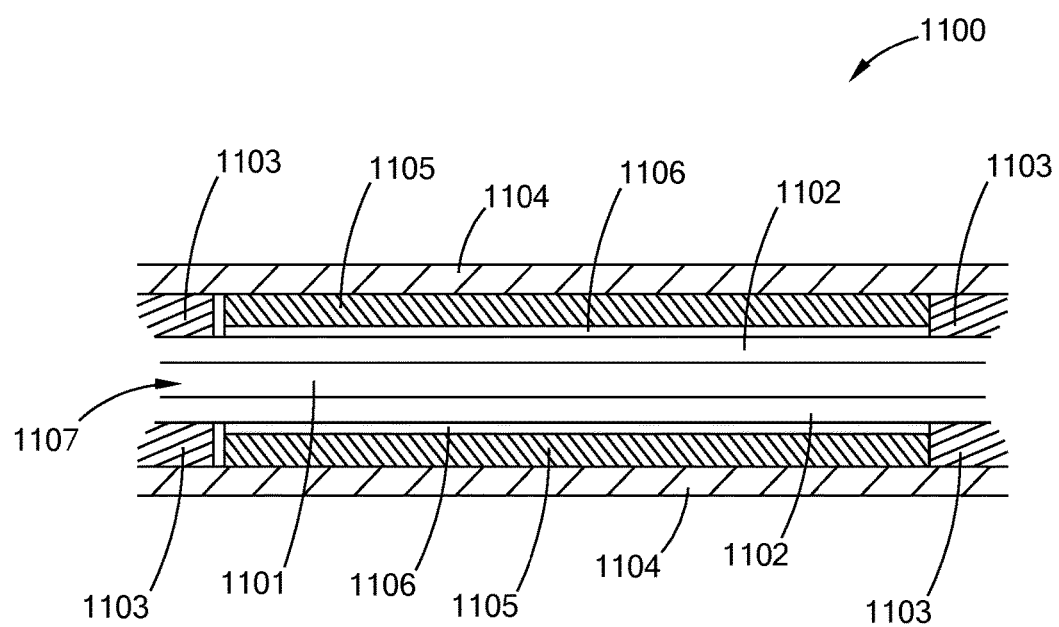
FIG. 1 is a cross section of an embodiment of a mode stripper in accordance with the present inventions.

In general, the present inventions relate to systems, methods and tools for transmitting and applying high laser beams and high power laser energy to perform laser operations, such as monitoring, welding, cladding, annealing, heating, cleaning, spelling, melting, ablating, vaporizing, drilling, cutting, and etching. In particular, the present inventions relate to methods and devices to remove undesirable laser energy from a laser system and generally from fiber optics in such a system. The present inventions further relate to mode strippers located on, or as a part of, optical fibers and which remove undesirable laser energy from the cladding of the optical fiber. Preferably, embodiments of the present mode strippers remove these undesirable laser energies, from the cladding of the optical fiber, while preferably not disrupting the transmission of the operable laser energy (e.g., the laser beam being transmitted in the core of the fiber and intended to perform a laser operation) and not disrupting the laser operation. Preferred embodiments of the mode strippers are passively cooled.

In general, in an embodiment there is an optical apparatus that includes an optical fiber, optical contact material, heat spreaders and a laser light source. The continuous-wave laser light source illuminates the optical fiber and light (e.g., laser beam, laser energy) propagates through the fiber. The light can propagate in the core and in the guiding cladding layer or layers if multiple outer claddings are used.

Light transported in the fiber cladding or claddings can cause detrimental effects in the optical fiber and optical instruments attached to or surrounding the fiber output. Significant optical power, e.g., laser energy, can be present in the cladding when the source laser is a kW class average power system or higher, for example 10 kW, 20 kW, 40 kW, 60 kW, 1 to 60 kW, 5 to 20 kW, 5 to 40 kW, 10 to 50 kW, or more. This power can be transferred from the core of the optical fiber to the cladding(s), for example by micro bend losses, macro bend losses, splice losses and thermal stress effects. Thus even an ideal initial laser launch condition can be degraded to cause system failures due to unwanted optical power in the cladding(s). Light power in the cladding can interact with polymer layers surrounding the fiber leading to heating effects and melting of the fiber if the optical transport is degraded by the local heating effects. Optical equipment designed to operate with light divergent from the fiber core can be damaged due to the higher divergence or higher numerical aperture of the output beam when significant power is present in the cladding(s). "Significant power" as used herein unless expressly stated otherwise, can be considered to be tenths of a percent of the power transported in the core, typically for a 20 kW laser system it could be expected to observe 1% of the total optical power to be guided in the cladding layer(s).

Thus, embodiments of the present mode strippers prevent the cladding power from being less than 1% of the core power, less than 0.9% of the core power, less than 0.5% of the core power, less than 0.1% of the core power, and less. This reduction is cladding power can be for example present at the point of where the laser fiber enters the laser tool, and more preferable at the point where the laser fiber is launched into an optic, optical assembly, e.g., a beam shaping and processing assembly, for providing a final laser beam for performing a laser operation. Additionally, this reduction or elimination of cladding power can occur with respect to managing and eliminating back reflect propagation within the cladding.

To address the problems, and detrimental effects of cladding layer laser beam transmissions, reliable fiber optic system operation may be obtained by means of an optical cladding mode stripper which removes light propagating in the cladding layer(s) of the fiber and transfers that optical power to a material or materials that strip or dissipate the power into a heatsink (which is passively cooled or actively cooled). The heatsink transports power away from the fiber to maintain a safe thermal condition for the fiber and stripper materials. The heatsink can be part of a larger cooled structure that is gas or liquid cooled such as by air or water.

In general, and preferably, the cladding stripper is in direct contact with the outer glass cladding of the fiber. The protective and low index guiding polymers must be carefully removed in the region of the stripping process. An optical material must be applied to the cladding to prevent total internal reflection from guiding the laser power through the cladding. In embodiments there is utilized a structure to regulate light coupling from the cladding using dimensionally controlled materials. The use of fused silica nanospheres with diameters in the range of 100 to 2000 nm can be brought in contact with the cladding layer. The density of the spheres in the vicinity on the cladding dictates the optical power that can couple out of the cladding and into the stripper material. The fused silica spheres can be supported in transparent medium such as sodium silicate. The sodium silicate can be applied in a liquid state with the nano-spheres mixed in. The Sodium silicate dries into a solid transparent medium which holds the nano-spheres in place. The nano-spheres can be selected by material for their refractive index properties, such as diamond or spinel. The nano-spheres can be applied in discrete, such as single points or spots a few mm in length or continuous application to provide additional levels of control.

The nano spheres may also be made from materials such as sapphire, and borosilicate glass. Further optical gels could be use in this capacity, such as Cargille gel ND1.46.

Thus, turning to FIG. 1 the is shown a cross sectional view of a high power optical fiber cable 1100, the cable has an optical fiber 1107 having a core 1101 and a cladding 1102, an inner protective layer 1103 (which can be a polymer, Teflon®, polytertrafluroethylene (PTEE), composites, and other materials know to the art, for example those that are disclosed in US Patent Publication No. 2010/0215326, the entire disclosure of which is incorporated herein by reference) and an outer protective layer 1104 (which can be a metal tube, a composite structure or tube having for example graphite or carbon fibers and other materials know to the art, for example those that are disclosed in US Patent Publication No. 2010/0215326, the entire disclosure of which is incorporated herein by reference). The optical fiber cable 1100 has a mode striper 1106 that is in optical contact with the outer surface of the cladding 1102 and in thermal contact with a heat sink 1105.

While the embodiment of FIG. 1 has a single clad fiber, it is understood that embodiments of the present mode strippers can be used in other types of fibers, for example fibers having two, three, four or more cladding layers, fibers having graded index fibers, step index fibers, hollow core fibers as well as other optical fibers.

Embodiments of the mode stripper are made of a group of nano-particles that are placed in optical contact with the surface of the cladding. Preferably, the surface of the cladding is prepared by removing reflective coatings, roughing the surface, or other techniques to enhance the transmission of light in the cladding into the mode stripper. The nano-particles can be any shape or configuration; they can be spheres, spheroids, squares, diamonds, ellipsoids, egg shaped, and any other volumetric shape, they can be the same or different shapes. The density of the nano-particles in the mode stripper can be varied either along the length of the cladding, along the depth (or thickness of the mode stripper) or both. In this manner the amount of light removed from the cladding, and thus the resultant heat load that must be managed, can be controlled and preferably in some embodiments distributed more evenly.

Thus, the embodiments of the present mode strippers can have a vary density of nano-particles resulting in the predetermined and controlled stripping of light from the cladding with an essentially uniform heat load to the heat sink located along the length of the mode stripper.

The mode stripper can have a thickness that is equal to the cladding thickness, greater than the cladding thickness, or less than the cladding thickness. The mode stripper can have a thickness of at least about 1.5 µm, at least about 2 µm, at least about 5 µm, from about 2 µm to about 20 µm, from about 10 µm to about 200 µm, less than about 100 µm, less than about 150 µm, and less than about 250 µm, about 1 µm, as well as other thicknesses.

The nano-particles can have a cross section of about 100 nm and greater, about 100 nm to about 2000 nm, about 500 nm to about 1500 nm, and about 2000 nm, about 50 nm, about 100 nm, about 150 nm about 250 nm, about 400 nm, about 750 nm, about 1,000 nm, about 1,7500, and combinations, variations of these sizes and other sizes. In some embodiments a polishing compound can be used to test and evaluate small and very small particles.

The mode stripper can be along essentially any length of the fiber cladding. Preferably, the mode stripper is about 1 cm and greater, about 1 cm to about 100 cm, about 5 cm to about 25 cm, and less than about 500 cm, about 5 cm to about 10 cm, about 5 cm to about 50 cm, about 10 cm to about 50 cm, about 50 cm to about 200 cm, about 50 cm, about 75 cm, about 100 cm, about 200 cm, about 300 cm, about 400 cm, about 750 cm, it being understood that longer and shorter distances, and combinations and variations of these distances, can be used based upon, for example, laser power and heat loads, and heat management in the system.

Although not limited to such applications and uses, embodiments of the present inventions may be employed or utilized with, or in conjunction with conventional high power laser systems, tools, applications and uses, such as short distance high power laser transmission systems that are commercially used in manufacturing, such as, e.g., in the automotive industry, welding, paint removal, and material processing and cutting; and intermediate and longer distance systems and applications, including applications that over distances greater than 100 m, greater than 200 m, greater than 500 m, greater than 1 km, greater than 2 km, and greater, from 10 m to 2 km, from 100 m to 500 m, from 10 m to 50 m, from 500 m to 1 km, from 500 m to 3 km, and greater and shorter distances.

The present inventions may be utilized, and preferably are utilized and employed with, or in conjunction with, laser systems and applications for: mineral and resource recovery and management, including, geothermal, hydrocarbon exploration and production, drilling, workover and completion, reentry and reworking, perforation, stimulation, hydraulic fracturing, plugging, decommissioning and abandoning; mining; waste removal and remediation, to name a few.

The present inventions may be utilized with and provide benefits to methods, apparatus and systems for the delivery of high power laser beams to cut and remove structures in the earth, and in particular, for surface decommissioning activities for hydrocarbon wells, among other things. The present inventions also relate to the laser welding of surfaces and materials, and in particular such surfaces and materials that are located in remote, hazardous, optically occluded and difficult to access locations, such as: oil wells, boreholes in the earth, pipelines, underground mines, natural gas wells, geothermal wells, subsea structures, or nuclear reactors.

The present inventions may be utilized with, and provide benefits to methods, systems and apparatus for the utilization of high power laser beams at the delivered location, e.g., distal locations, for activities, such as, monitoring, welding, cladding, annealing, heating, cleaning, drilling and cutting.

In particular, the present inventions preferably find application and use with the novel and innovative high power long distance laser systems and recent breakthroughs in long distance high power laser transmission and applications of Foro Energy, Inc., which would include for example: U.S. Pat. Nos. 8,511,401, 8,571,368, 8,627,901, 8,424,617, 8,636,085, 8,662,160, 8,684,088, 8,701,794, 8,720,575, 8,720,584, 8,757,292, 8,783,361, 8,783,360, 8,820,434, 8,826,973, 8,869,914, 8,879,876, 8,936,108, 8,997,894, 9,027,668, 9,074,422, 9,089,928, 9,085,050, 9,080,425, 9,138,786, 9,244,235, 9,242,309, 9,284,783, 9,291,017, 9,267,330, 9,327,810, 9,360,631, 9,360,643 and US Patent Application Publication Nos. 2015/0321290, 2014/0090846, 2012/0074110, 2013/0228372, 2012/0273470, 2012/0067643, 2016/0158817, 2014/0190949, 2014/0231398, 2015/0129203, 2014/0069896, 2017/0214213, 2016/0221125 and 2016/0084008, the entire disclosure of each of which is incorporated herein by reference.

The present inventions, although applicable to lower power applications, and having benefits in lower power levels, are preferably used and provide significant benefits in high power systems and applications, such as where the laser energy is greater than 2 kW of power, greater than 5 kW of power, greater than 10 kW of power, greater than 20 kW of power, greater than 40 kW of power, and greater than 50 kW of power, and greater. The present inventions find application in single fiber systems and multiple fiber systems.

Figure 2:
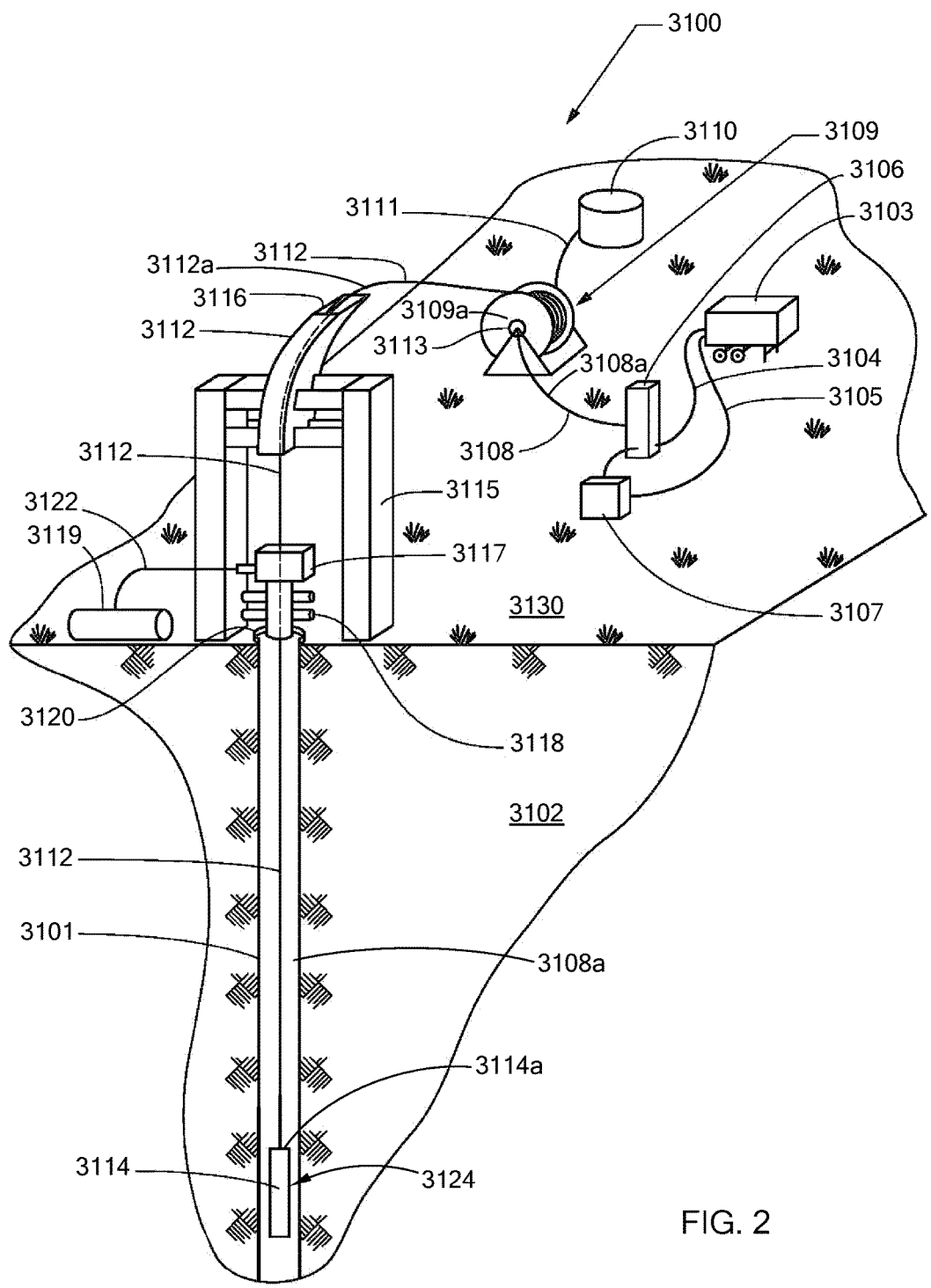
FIG. 2 is a perspective view of an embodiment of a deployed mode stripper protected laser system in accordance with the present inventions.

Turning to FIG. 2, one, two, three, four, five or more mode strippers may be located various points along the optical fiber(s) in a high power laser system. Thus, by way of example, turning to FIG. 2 there is shown a deployed laser system having mode strippers. In this embodiment there is a mobile laser system 3100 for performing laser activities such as drilling, workover and completion and flow control, in a borehole 3101 in the earth 3102 that is protected with an embodiment of the present mode strippers. FIG. 2 provides a cut away perspective view showing the surface of the earth 3130 and a cut away of the earth below the surface 3102. In general and by way of example, there is provided a source of electrical power 3103, which provides electrical power by cables 3104 and 3105 to a mobile laser 3106 and a chiller 3107 for the laser 3106. The laser provides a laser beam, i.e., laser energy, that can be conveyed by a laser beam transmission means 3108, e.g., a high power optical fiber having a core, a cladding and protective layers, to a spool of coiled tubing 3109. A source of fluid 3110 is provided. The fluid, e.g., high pressure gas, including air or nitrogen, is conveyed by fluid conveyance means 3111 to the spool of coiled tubing 3109.

The spool of coiled tubing 3109 is rotated to advance and retract the coiled tubing 3112. Thus, the laser beam transmission means 3108 and the fluid conveyance means 3111 are attached to the spool of coiled tubing 3109 by means of rotating coupling means 3113. The coiled tubing 3112 contains a high power optical fiber in a protective tube for transmitting high power laser energy to the laser tool 3114. The coiled tubing 3112 also contains a means to convey the fluid along the entire length of the coiled tubing 3112 to the laser tool 3114.

Additionally, there is provided a support structure 3115, which holds an injector 3116, to facilitate movement of the coiled tubing 3112 in the borehole 3101. Further other support structures may be employed for example such structures could be derrick, crane, mast, tripod, or other similar type of structure or hybrid and combinations of these. In some applications, as the borehole is advance to greater depths from the surface 1030, the use of a diverter 3117, a blow out preventer (BOP) 3118, and a fluid and/or cutting handling system 3119 may become necessary. The coiled tubing 3112 is passed from the injector 3116 through the diverter 3117, the BOP 3118, a wellhead 3120 and into the borehole 3101. The fluid is conveyed to the laser tool 3114 in the borehole 3101. At that point the fluid exits the laser cutting tool 3114 in association with the laser beam 3124. The wellhead 3120 is attached to casing. For the purposes of simplification the structural components of a borehole such as casing, hangers, and cement are not shown. It is understood that these components may be used and will vary based upon the depth, type, and geology of the borehole, as well as, other factors. Embodiments of the present mode strippers, can be located in the system, for example, mode stripper 3108a along fiber 3108, mode stripper 3109a at spool 3109, mode stripper 3112a on the fiber in the coiled tube 3112, mode stripper 3108a on the fiber in the borehole 3101, and mode stripper 3114a in the laser tool 3114.

One, two, three or more mode strippers can be used in laser workover and decommissioning systems, which systems are used to perform laser operations, such as cutting, hole boring, and the removal, replacement and repair of tubulars, for operations such as plugging and abandonment of a well. These systems can be land based, mobile, and off shore based. The mode strippers can be located at any point along the high power laser beam path as it travels in a high power laser beam transmission fiber.

One, two three or more mode strippers can be used in off shore laser systems for drilling, decommissioning or workover by way of example. Thus, turning to FIG. 3 there is shown an embodiment of an off shore laser BOP system that has mode strippers located at any point along the optical fiber and laser systems, from the drill ship to the laser shear rams in the BOP on the sea floor.

In the embodiment of this drilling system there is provided a dynamically positioned (DP) drill ship 9100 having a drill floor 9129, a derrick 9131, a moon pool 9130 (as seen by the cutaway in the figure showing the interior of the drill ship 9100) and other drilling and drilling support equipment and devices utilized for operation, which are known to the off shore drilling arts, but are not shown in the figure. This drilling system also has a laser assisted subsea riser and BOP package 9150. Although a drill ship is shown in this embodiment, any other type of offshore drilling rig, vessel or platform may be utilized. The laser assisted subsea riser and BOP package 9150, as shown in this figure, is deployed and connecting drill ship 9100 with a borehole 9124 that extends below the seafloor 9123.

The laser assisted riser and BOP package 9150 has a riser 9105 and a laser assisted BOP stack 9108. The upper portion, i.e., the portion of the riser when deployed that is closest to the surface of the water 9104, of riser 9105, is connected to the drillship 100 by tensioners 103 that are attached to tension ring 9102. The upper section of the riser 9105 may have a diverter 9101 and other components (not shown in this figure) that are commonly utilized and employed with risers and are well known to those of skill in the art of offshore drilling.

The riser 9105 extends from the moon pool 9130 of drill ship 9100 and is connected to laser assisted BOP stack 9108. The riser 9105 is made up of riser sections, e.g., 9106, that are connected together, by riser couplings, e.g., 9107, and lowered through the moon pool 9130 of the drill ship 9100. The lower portion, i.e., the portion of the riser that when deployed is closest to the seafloor, of the riser 9105 is connected to the laser assisted BOP stack 9108 by way of the riser-BOP connecter 9111. The riser-BOP connecter 9111 is associated with flex joint 9112, which may also be referred to as a flex connection or ball joint. The flex joint 9112 is intended to accommodate movements of the drill ship 9100 from positions that are not directly above the laser assisted BOP stack 9108; and thus accommodate the riser 9105 coming into the laser assisted BOP stack 9108 at an angle.

The laser assisted BOP stack may be characterized as having two component assemblies: an upper component assembly 9109, which may be referred to as the lower marine riser package (LMRP), and a lower component assembly 9110, which may be referred to as the lower BOP stack or the BOP proper. In this embodiment, the upper component assembly 9109 has a frame 9113 that houses an annular preventer 9115. The lower component assembly 9110 has a frame 9114 that houses an annular preventer 9116, a shear laser module ("SLM") 9117, a first ram preventer 9118, a second ram preventer 9119, and a third ram preventer 9120. As used herein unless specified otherwise, the term "ram preventer" is to be given its broadest definition and would include any mechanical devices that clamp, grab, hold, cut, sever, crush, or combinations thereof, a tubular within a BOP stack, such as shear rams, blind rams, blind-shear rams, pipe rams, casing shear rams, and ram blowout preventers such as Hydril's HYDRIL PRESSURE CONTROL COMPACT Ram, Hydril Pressure Control Conventional Ram, HYDRIL PRESSURE CONTROL QUICK-LOG, and HYDRIL PRESSURE CONTROL SENTRY Workover, SHAFFER ram preventers, and ram preventers made by Cameron. The laser assisted BOP stack 9108 has a wellhead connecter 9121 that attaches to wellhead 9122, which is attached to borehole 9124.

Figure 3:
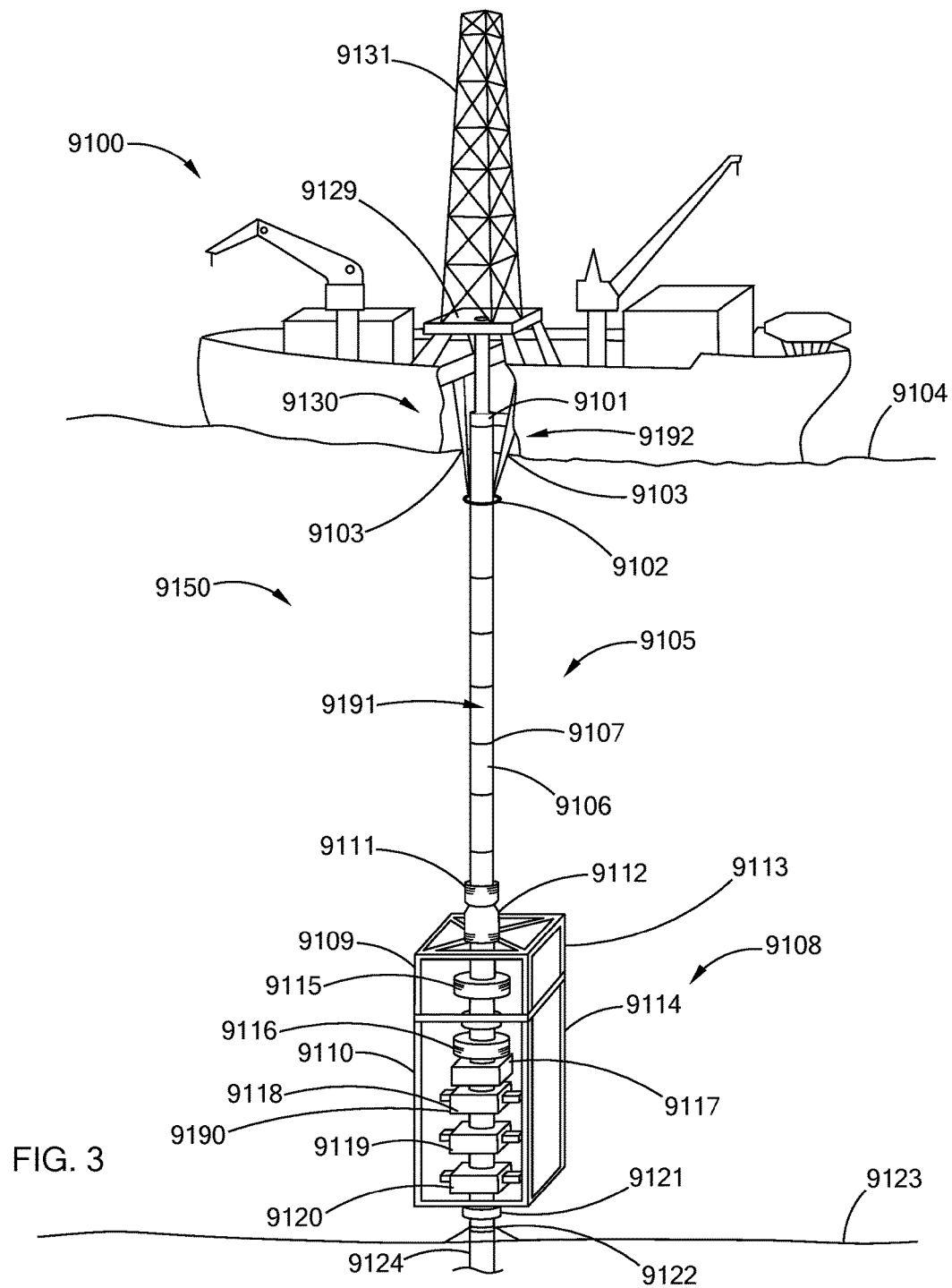
FIG. 3 is a perspective view of an embodiment of a deployed mode stripper protected off shore laser system in accordance with the present inventions.

The riser has an internal cavity, not shown in FIG. 3 that is in fluid and mechanical communication with an internal cavity, not shown in FIG. 3, in the laser assisted BOP stack. Thus, as deployed, the laser assisted riser and BOP package 9150 provides a cavity or channel putting the drillship 9100 in fluid and mechanical communication with the borehole. The laser assisted BOP stack frames 9113, 9114 protect the BOP, and may have lifting and handling devices, a control and connection module, and other equipment and devices utilized in subsea operation, which are known to the art, but are not shown in the figure. The internal cavity in the stack goes through the stack from its top (closest to the surface of the water 9104) to its bottom (closest to the seafloor 9123). This cavity, for example, could be about 18¾" in diameter and has a cavity wall.

Embodiments of the present mode stripper are located along the system. Thus, mode stripper 9190 is located in the laser cutter in the laser ram sheer, mode stripper 9191 is located on the high power laser transmission fiber in the riser, mode stripper 9192 is located on a high power laser transmission fiber in the system within the drill ship.

Turning to FIGS. 11 and 11A the is shown a mode stripper protected embodiment of a deployed high power laser tool, in which the mode strippers can be located at any point along the optical fiber, laser systems and laser tools. Similarly, in laser work over and completion systems, laser decommissioning systems (both on shore and off shore) the mode strippers can be utilized at various points along the optical fiber, system and tools.

Thus, there is shown a borehole 4102 having a well head 4104, a BOP 4105 and a diverter 4106, or other assembly to maintain pressure and handle the return of drilling fluids to the surface 4103. Conveyance structure 4101, which may be a line structure, is shown extending into the borehole 4102 and down to and being connected with an embodiment of an electric motor laser bottom hole assembly (EM-LBHA) 4100. There is also a whipstock 4109 and casing 4108 in the borehole, and the borehole has been advanced in a primarily horizontal direction from the general location of the whipstock 4109 in the borehole 4108. The conveyance structure 4101 would be connected to a drilling unit, workover and completion unit, or similar type of unit and laser assembly (not shown in this drawing).

FIG. 11A shows a more detailed view of the EM-LBHA 4100 and sets forth the general components that that may make up an EM-LBHA. It being recognized that additional general components may be added or used and that, applying the teachings of this specification, the order and arrangement of these components may be varied, without departing from the spirit of the inventions.

In FIG. 11A, the EM-LBHA 4100 has a conveyance structure 4101 in mechanical, and fluid communication with an upper motor section 4121 by way of a conveyance structure connecter 4120. The upper motor section 4121 is connected to the motor section 4123, below the motor section is a lower motor section 4122, and below the lower motor section 4123 is a laser-mechanical bit 4124.

Embodiments of the mode stripper(s) can be located on the high power optical fiber at various locations, such as, 4190, 4091, 4091, and 4093.

The present mode strippers can be used to strip, e.g., remove forward propagating light in the cladding and backward, e.g., back reflections, propagating light in the cladding, and both.

In longer fibers, for example an about 10 cm mode stripper can be located about every 500 m of fiber length, every 1000 m of fiber length. In embodiments of laser systems that have, for example, numerous splices, optics, bends, optical slip rings, the spacing or frequency of mode stripers and be located adjacent to those locations where it is likely, highly likely or know to have laser energies in the cladding.

In an embodiment, the density of the nano-spheres can be selected to allow a smaller proportion of the light to couple at points in the fiber where the power is high and as power is reduced by the stripping process the density of nano-spheres increased to maintain uniform heat loading and efficiency of the cladding stripping process.

Further, in embodiments of the mode stripper a non-metallic heat spreader material can be used with the optical fiber to dissipate the thermal optical power from the stripper material, e.g., a heatsink. For example, a non-metallic and transparent medium can be used to avoid issues with plasma formation at the optical material interface that can occur with high optical power densities in the optical fiber. These non-metallic materials for the heat spreader can include for example diamond and sapphire. A translucent or transparent heat spreader avoids issues with increased localized heat densities due to optical absorption.

In a high average power system, the power from the cladding is preferably removed over a region of the fiber so as, to reduce, minimize, and most preferably not to cause localized heating that leads to thermal failure of the fiber or stripper materials. The stripper materials, preferably, provide a structure that weakly removes the optical power and distributes it over a length of heat sink material to create a thermal profile compliant with long term operation of the fiber and materials. For a 660 um cladding with 1% of 20 kW core power transport this has been demonstrated, for example, to be 5 to 10 cm of heatsink material Embodiments may include one or more of the following features. The aspect of the light output from the optical fiber may be the divergence, brightness or numerical aperture of the light output from the optical fiber. The optical fiber may have an associated core diameter and length for an expected cladding power transport such as 600 um core 660 um cladding and lengths greater than 200 m. The output wavelength of the continuous-wave laser light source may be between, 450 nm to 2500 nm, up to about 1800 nm, greater than about 1000 nm, greater than about 1900 nm, from about 450 nm to 700 nm, about 700 nm to 1080 nm, about 700 nm to about 1800 nm, about 400 nm to about 550 nm, about 500 nm to about 650 nm, about 1050 nm, about 1070 nm, and about 1080 nm and about 1080 nm about 1125 nm to about 1190 nm, and about 1400 nm. The continuous-wave laser light source may include a fiber laser. A pulsed or continuous laser source may be utilized.

In general, in one aspect, a method of removing laser light from the outer cladding of an optical fiber that includes a transparent optical support medium for the spheres, a selection of transparent nano-spheres, a transparent non-metallic heat spreader, a cooling structure for the heat spreader.

The cladding stripper can be used with a single pass transmission along a fiber to a target or optical systems or tools. It can also be used in a fiber laser system with a resonator. This includes actively doped fiber laser such as Ytterbium or nonlinear fiber optical systems such as a Stimulated Raman scattering (SRS) laser.

Embodiments of the mode stripers, and in particular mode strippers having nano particles, can also be used with other optical components, such as optical blocks, optical connectors, and optical couplers. Thus, the mode strippers can be used in, or as the mode strippers at the locations and on the optical components disclosed in US Patent Publication 2013/0011102 the entire disclosure of which is incorporated by reference.

Turning to FIGS. 4A to 4F there is provided an embodiment of a passively cooled high power connector 100, having a mode stripper of the general type of FIG. 1. In FIG. 4A there is provided a perspective view of the connector 100. In FIG. 4B there is provided a view of the face end 102 of the connector; and in FIG. 4C there is provided a schematic cross-sectional view of the components of the connector taken along line C-C of FIG. 4B. In general, the connector 100 has a face end 102 and a tail end 104. The face end 102 has an opening 108 through which a laser beam is launched, along a laser beam path. The tail end 104 has an opening 114. The tail end opening 114 is formed by an attachment member 112. It is also contemplated that an additional window that may be coplanar with face end 102 may be utilized, or the window 130 may be positioned coplanar with face end 102, or window 130, or a second window, may extend beyond face end 102.

A high power optical cable 106, having a high power optical fiber 107, is contained within the attachment member 112. The attachment member 112, may be a threaded pressure-fitting type device, such as for example a SWAGELOK, or other type of locking member, and attaches to and seals against the outer surface of the optical cable 106.

In the embodiment of FIGS. 4A to 4F, the optical cable is an optical fiber in a stainless steel metal tube, the tube having an outside diameter of about ⅛" ("inch"). The optical fiber has a core diameter of about 1000 µm, (microns), a cladding thickness of about 50 µm, (the thickness of a layer or coating is measured from the internal diameter or inner surface of the layer or coating to the outer diameter or outer surface of the layer or coating) and an acrylate coating thickness of about 100 µm. The optical fiber is within a TEFLON sleeve, that is within the stainless steel tube. The optical cable may be an optical fiber without any added outer protective layers. It may be, for example, any of the configurations disclosed and taught in US Patent Publication Nos. 2010/0044106, 2010/0215326, and 2012/0020631, the entire disclosures of each of which are incorporated by reference herein.

Although a single optical cable is shown in the embodiment of FIGS. 4A to 4F, and in other embodiments herein, multiple optical cables may be utilized, or a single optical cable with multiple optical fibers may be utilized. Thus, for example, an optical-fiber squid may be used, a beam combiner may be used, or other assemblies to combine multiple fibers into a single fiber may be used, as part of, or in conjunction with the connectors of the present invention. The multiple fibers may further be combined at or near an optical block within the connector or outside of the connector. Thus, for example, they may be combined at some other location in the system, tool, or device that the connector is intended to be associated with.

The high power passively cooled connector 100 has a body 116, having a housing, which in this embodiment has two housing sections 118, 120. Housing section 118 forms cavity 119 and housing section 120 forms cavity 121. Housing section 118 and housing section 120 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations and variations thereof.

Housing section 120, which is adjacent to and forms a portion of the face end 102, has an outer surface having a predetermined shape, which has three sub-sections, front sub-section 122, middle sub-section 124, and back sub-section 126. Front sub-section 122 has an essentially cylindrical shape. Middle sub-section 124 has an essentially frustoconical shape. Back sub-section 126 has an essentially cylindrical shape having a larger diameter than front sub-section 122.

The housing 118 has an opening 110, which forms part of the cavity 119. The opening 110 is configured to receive and hold the attachment member 112. The cable 106 extends through opening 110.

The cable 106 and the optical fiber 107 are affixed and held within the body 116. The stainless steel tube of the cable 106 extends through openings 114 and ends, having end 109, in the general area of opening 110. The end 109 of the stainless steel tube, preferably may be located anywhere past the point of mechanical attachment and sealing by the attachment member 112 up to the adhesive dam 156. The TEFLON tube also may end at the end 109 of the stainless steel tube. The TEFLON tube, preferably may be located anywhere past the point of mechanical attachment and sealing by the attachment member 112 up to the adhesive dam 156. It being understood, that depending upon the type of attachment member, the type of optical cable, and other considerations, the end of any protective layers of the optical fiber, such as the TEFLON and stainless steel tubes in the embodiment of FIGS. 1A to 1F, may be at different locations, the same locations, or other locations within, partially within, or outside of the connector body.

In the embodiment of FIGS. 4A to 4F, the optical fiber 107 exits the end 109 of the stainless steel tubing and extends through the cavities 119, 121 of the body 116 and housings 118, 120. The optical fiber 107 extends through these cavities 119, 121 and terminates at fiber face 167. The optical fiber exiting the end 109 of the stainless steel tubing, has its core, cladding and acrylate coating. The optical fiber 107 extends through the adhesive dam 156 and into and through adhesive dam 152. At about the location of the adhesive dam 152, the acrylate coating is removed from the optical fiber leaving the core and the cladding. The optical fiber, having the core and cladding extends from the adhesive dam 152 through the cavity 121 to the fiber face 167. The adhesive dams 156, 152, have springs 158, 150 associated with them. It being understood, that depending upon the type of attachment member, the type of optical cable, and other considerations, the coating of the optical fiber, such as the acrylate coating, in this embodiment, may end at different locations, the same locations, or other locations within, partially within, or outside of the cavity or connector body.

The optical fiber 107 extends through spring 150, adhesive dam 148, cavity 121, adhesive dam 146, spring 144, spacer 142, ferrule 140, and into laser launch ring 132. FIG. 4D provides an exploded schematic view of the components of the connector, and FIGS. 4E and 4F provide enlarged schematic cross-sectional views of the launch ring area of the connector. Laser launch ring 132 has two o-rings 136, 138 that engage the outer surface of the laser launch ring 132 and the inner surface of the cavity 121. The o-rings may form seals preventing debris from entering into the cavity 121 and may also dampen vibration and shocks.

Spacers 160, 162 are located within cavity 119 and around optical fiber 107. The spacers 160, 162 form a cavity through which the optical fiber 107 is located. When assembled spacers 160, 162 abut against spring 158, compressing spring 158, and thus, place a preload on dam 156.

One manner, by way of example, in which the components may be assembled, is to slide the optical fiber into the cavity through the various components, so that the end of the fiber extends out beyond the face end 102 of the connector (the window 130 is not yet in place at this point in the assembly process). The end 109 of the stainless steel tube provides a convenient stop member for controlling how far beyond the end of the face 102 the fiber can be extended during assembly. The end 109 may abut against a ledge or a dam in cavity 119. At which point in the assembly process, the general amount of fiber length needed is determined, and the fiber extending from the face is cleaved off. (If further processing of the face of the fiber is to occur, such as polishing, coating, or forming an optical surface, such as a lens, it may be performed at this point in the assembly process.) The fiber is then pulled back into the cavity and the attachment member 112 is tightened or otherwise locked against the optical cable 106 fixing its general position with respect to the connector 100, and in, particular the receptacle aligning surface 124, as well as, potentially the end face 102.

An annular gasket 134 is located adjacent the face 165 of the laser launch ring 132. The gasket 134 is located between a window 130 and the laser launch ring 132. A locking ring 128 engages a ledge 174 and a portion of the surface of the window 130. The locking ring 128 has openings 129 for receiving a tool for placing and tightening (threading) the locking ring in place within the cavity 121. In this manner the locking ring 128 forms a portion of the face end 102 and the opening in the locking ring 128 forms the opening 108 of face end 102. Other forms of attaching the locking ring may be employed.

When the locking ring 128 is tightened and in engagement with ledge 174 and window 130 the other components, i.e., laser launch ring 132, ferrule 140, and spacer 142 are forced against spring 144, creating a preload on those components, as well as, providing a force against dam 146 holding it in place against a ledge, formed by housing section 120, in the cavity 121.

Epoxy, 170, 172 is used to hold the fiber 107 in place with respect to the body 116 and the face end 102 of the connector 100. The epoxy is added to the cavities 121, 119 through ports. Preferably, in this embodiment, the portions of cavities 121, 119 between dams 146, 148 and dams 152, 156 are completely filled with epoxy providing for the secure attachment of the fiber to the housing sections 118, 120 of the body 116 of the connector 100. Once the epoxy has been added set screws 154 are inserted into the ports sealing them. In this manner the ports do not form an opening connecting the cavity or the inner portions of the housing to the outside of the housing. The ports, being so plugged, are incapable of transmitting or conveying a cooling fluid. The ports may also be plugged with epoxy or by other means.

Although not specifically shown in the figures, break detection and back reflection monitoring devices and systems may be utilized with, or integrated into, the connectors and the high power optical cables. Examples of such break detection monitoring devices, systems and methods are taught and disclosed in U.S. Patent Application Ser. No. 61/446,407; and Ser. No. 13/403,723, and US Patent Application Publication No. 2010/0044106, the entire disclosure of each of which are incorporated herein by reference.

The spacer 142 may be made from for example a metal, a ceramic, a composite material, a glass, fused silica, sapphire, a polycrystalline structure, a thermoplastic, or other suitable types of material. In the embodiment of FIGS. 4A to 4F the inner wall of the spacer is removed from the outer surface of the fiber, i.e., the ID ("inner diameter") of the spacer is greater than the OD ("outer diameter") of the fiber, and thus, creates a cavity between the spacer and the fiber. This cavity 142a may be filled with a liquid having a predetermined index of refraction, e.g., equal to or greater than the index of refraction of the cladding, to enable the spacer to function as a mode stripper, to remove back reflections that are traveling up the cladding, e.g., moving from the distal end of the fiber to the proximal end of the fiber, before those back reflections reach the location where the acrylate or other coating is present. The liquid may be the carrier material having nano-particles, e.g., fused silica spheres, thus providing a mode stripper. The fused silica spheres can be supported in the carrier materials, e.g., a transparent medium such as sodium silicate. The sodium silicate can be applied in a liquid state with the nano-spheres mixed in. Further, the ID of the spacer may be substantially the same as the OD of the fiber, e.g., so that the spacer or fiber may be inserted but is also in physical contact, placing the spacer in physical and optical contact with the fiber, and thus, depending upon the materials used for the spacer, it may also function as a mode stripper. The OD of the spacer is preferably substantially the same as the ID of the cavity 121 in the location of the spacer, e.g., so that the spacer may be inserted but is also in physical contact.

The ferrule 140 may be made from, for example, a metal, a ceramic, a composite material, a glass, fused silica, sapphire, a polycrystalline structure, a thermoplastic, or other suitable types of material. In the embodiment of FIGS. 4A to 4F the inner wall of the ferrule is adjacent the outer surface of the fiber. The ferrule functions as a mode stripper either by removing some, and preferably the majority of back reflections propagating along the cladding from the distal end to the proximal end, by being in optical association with the fiber and thus transmitting removed back reflections away from the fiber toward the housing, or in the case of a non-transmissive material absorbing the back reflection energy that escapes from the cladding and conveying the heat thus generated to the housing. The inner surface of the ferrule may have a cavity or space where fused silica spheres can be supported in a transparent medium such as sodium silicate. The sodium silicate can be applied in a liquid state with the nano-spheres mixed in. The sodium silicate nano-sphere mode stripper is in optical contact with fiber, and in thermal contact with the ferrule.

The thermal properties, e.g., CTE, of the ferrule 140, and the spacer 142, preferably are closely matched to that of the fiber, and that of the housing. However, in this embodiment, the connector design is capable of using materials having a considerably different CTE from the fiber. This is accomplished by having the fiber fixed at the epoxy section 172, but only being slideably engaged with the laser launch ring 132, the ferrule 140, and the spacer 142. In this manner the different CTE of the structures associated with the fiber, from the fibers point of fixation in the housing to the fiber face will not put stress upon or break the fiber as those structures expand and contract at different rates from the fiber over the range of operating temperatures of the connector.

The design of the connectors, and the selection of and potential matching of CTEs for components of the connectors provide for the ability to have the connectors desensitized to localized heating. Preferably, in the embodiment of FIGS. 4A to 4F, the CTE of the ferrule and the housing should be closely matched to further mitigate misalignment issues over large temperate ranges. Thus, and for example, in managing back reflections, which could cause localized heating of the connector components, the design of the components manage this localized heating in a manner that does not materially change the alignment and relative location where the laser beam is launched from the connector (or received into the connector) with respect to the surface or portion of the housing that is used to mechanically position the connector in a receptacle, or tool, or other device.

The use of a biasing means, such as the springs or the preload during assembly provides the ability to manage greater g-loads, and g-loads across greater temperature ranges. The biasing assures that the components remain in the desired or intended contact with each other as the connector expands and contracts with temperature changes. In this manner the biasing prevents the components from being loosened or compressed during thermal changes. Additionally, and in particular in the embodiment of FIG. 4, the absence of heavy glass or other optical components permits the connector to handle larger vibrational forces.

Further, it is preferable that at least one of the locations where the fiber is fixed to housing, e.g., the epoxy, is located near to, adjacent or coplanar with the engagement surface of the housing that is used for aligning the connector in a receptacle. Still more preferable, the point or area of fiber fixation that is closest to the face end of the connector should be the fixation point, or area, that is closest to the engagement surface.

Turning now to the face end 102 of the connector 100, shown is FIGS. 4E and 4F, there is provided a novel configuration for the launching of the laser beam along a beam path 190 from the fiber face 167. The fiber 107, which in this embodiment includes a core and a cladding, extends into the laser launch ring 132. The fiber is not in physical contact with the laser launch ring 132, although in other embodiments it may be. The fiber face 167 in this embodiment may be a flat surface, it may be formed by cleaving the fiber, it may be polished, it is preferably perpendicular to the sides and longitudinal axis of the fiber, it may have a predetermined shape, such as a sphere, a curve, or function as a lens or other optic that shapes or affects the properties of the laser beam.

The laser launch ring 132 has an inner surface; in this embodiment the inner surface has at least two sections, a cylindrical surface 168, and an annular surface 166 (in this embodiment there is also another annular surface in the area of the sides of the fiber, which surface is not numbered). In this embodiment, the inner surface of the laser launch ring plays a role, from small to significant, in the management of back reflections, i.e., laser light traveling back through opening 164 from the window 130 toward the ferrule 140. To manage these back reflections the inner surface may be coated with material to absorb the back reflected light, shaped and coated with material to reflect the back reflected light, and preferably reflect the back reflected light back in a direction toward the window 130, and have surfaces that will defuse the back reflected light, e.g., a diffuser, which surfaces may transmit the diffused light, reflect the diffused light, and combinations and variations of these.

Gasket 134 is annular in shape and should not extend into the laser beam path 190. Gasket 134 is positioned between annular face 165 of the laser launch ring 132 and the proximal surface 131 of window 130. Preferably, both surfaces 131 and 133 have anti-reflective coatings on them. As can been seen in detail in FIG. 1F, the locking ring 128 engages the distal surface 133 of the window 130 around an outer annular area of that surface, while simultaneously engaging ledge 174, holding the outer surface 133 in a co-planer position with ledge 174.

The window may be made from fused silica, quartz, sapphire, suprasil, infrasil, calcium fluoride and other glasses, zirconium fluoride, diamond and other highly transmissive materials for the selected wavelength.

In operation the beam is launched from fiber face 167 into opening 164, which preferably is filled with air. Traveling along the beam path, the beam expands from fiber face 167 (in the case of a flat surface for the fiber face), travels through space 164 and enters the window 130 through surface 131. The beam then exits window 130 through surface 133 and is launched from the connector 100 through opening 108 in face end 102.

Thus, connectors of the type as shown in the embodiment of FIGS. 1A to 1F do not require, and are configured without the ability to have, active cooling, e.g., they do not have the capability of flowing a cooling liquid through the interior of the housing, the cavities, or in direct, i.e., in fluid, contact with the fiber or optical components. Further, the location of the epoxy, the housing's outer shape, and other features described above enable the connector to operate over a wide range of vibrations, temperatures and laser powers, including by way of example 0-10 kW, 0-500 g's, −40-400° F., while maintaining its beam quality, beam parameters, and its optical distance from and position with respect to a receptacle and the receptacle associated optics, tools, etc.

In general, absorptive coatings that may be used on surfaces for the laser launch ring, other components and other surfaces within or associated with the connectors of the present inventions are, for example black chrome, dendritic surfaces, absorptive anodization, and carbon coating, as well as other materials and constructs.

In general, reflective coatings that may be used on surfaces for the laser launch ring, other components, and other surfaces within or associated with the connectors of the present inventions are, for example, gold, silver, chromium, aluminum, copper, laser gold, MgF2, and HR coatings, as well as other materials and constructs.

In general, diffusing surfaces, or diffusers that may be used as surfaces for the laser launch ring, other components and other surfaces within or associated with the connectors of the present inventions may be, for example, fused silica, sapphire, ceramic, metal and a bead blasted surface finished with gold plating, as well as other materials and constructs.

In general, attachment members or combination of such members, for sealing to the cable at or near the tail end, attaching to cable at or near the tail end and both may be, for example, swagelok, flared fitting, threaded fitting, compressive fitting and crimped fitting, as well as other materials and constructs.

In general, the shape of the connectors, or the outer shape of the housings, may vary depending upon the particular application, use, receptacle, tool and other design and use factors. The housing, the front, the back, or both, may have more or less differently shaped sub-sections. The outer shape of the front housing may take on a configuration resembling the shape of commercially available connectors, and thus, may be able to plug directly into receptacles, systems, tools, etc., designed for use with such commercially available connectors. Such commercial connector types would include, by way of example, QBH, QD, Q5, QCS, SMA, LLK and SMA0.5.

In general, the optical cable used with the connectors may be an optical fiber with, or without any added outer protective layers. It may be for example any of the configurations disclosed and taught in US Patent Applications and US Patent Application Publications: Publication No. 2010/0044106; Publication No. 2010/0215326, and Publication No. 2012/0020631; and Ser. No. 12/840,978. Thus, for example it may be a single clad or multiple clad fiber. It may have a cross section that is square, rectangular or a shape other than circular. Multiple fibers may be used and enter into the tail end of the connector. The connector may have multiple face ends through which individual beams are launch in the same, parallel, diverging, converging and combinations of these directions. In may have a single face end that launches multiple beams that may be parallel diverging, converging and combinations of these directions. It may further have varying combinations and configurations of multiple and single fibers and beam launches.

In general the epoxy may be any suitable adhesive and would include for example, thermal cure, conductive epoxy, optically transmissive epoxy, 2-part epoxy, and room temperature cure epoxy, specifically NAOH, Epotek, and Optocast adhesives. A particularly beneficial, from the standpoint of ease of assembly, epoxy is a UV curable epoxy. With a UV curable epoxy ultraviolent light can be propagated down the fiber, at a wavelength that will readily escape the fibers cladding and which will cure the epoxy, which may avoid the need to use heat curable epoxies.

The shape of the connectors, for example the cylindrical and frustoconical section of the embodiment of FIGS. 4A to 4F and FIGS. 5A to 5E, may be predetermined to cooperate with a receptacle to provide for easy and consistent laser beam alignment and positioning, when the connector is placed in optical communication with the receptacle and whatever tools, assemblies, etc. may be associated with that receptacle. Further, a surface, or surfaces, of the connector may serve as contact points, or alignment and positioning points for the connector with respect to a receptacle. The face end of the connector need not, and is preferably not used as an alignment point, and thus, in this manner thermal changes that may affect the location or position of that end face will not affect the alignment and position of the connector.

Turning to FIGS. 5A to 5E there is provided an embodiment of a passively cooled high power connector 200. In FIG. 5A there is provided a perspective view of the connector 200. In FIG. 5B there is provided a view of the face end 202 of the connector; and in FIG. 5C there is provided a schematic cross-sectional view of the components of the connector taken along line B-B of FIG. 5B. FIG. 5D provides an exploded schematic view of the components of the connector, and FIG. 5E provides an enlarged cross-sectional view of the face end area of the connector. In general, in this embodiment, the connector 200 has a face end 202 and a tail end 204. The face end 202 has an opening 208 through which a laser beam is launched, along a laser beam path. The tail end 204 has an opening 214. The tail end opening 214 is formed by an inner attachment member 212 and an outer cover 213. These components 212, 213 may be attachment members, an attachment member and a cover, locking members, sealing members and combinations of these. More or fewer members and covers may also be utilized.

The use of a component, such as the cover 213, in one of the illustrated embodiments of the present connectors, but not in others, as well as, other components that may be used in only one, a few, less then all, or all of the illustrated embodiments, is not and should not be considered as a limitation that such components may only be used with those illustrated embodiments, or must necessarily be used with those illustrated embodiments. Rather, these components, consistent with the teachings herein, may be used with other embodiments, may be used with embodiments not expressly illustrated herein, and may be used with other connector configurations, without departing from the spirit of the inventions. The components, designs, teachings, configurations and arrangements for one embodiment of a connector may be utilized with, or for, the components, designs, teachings, configurations and arrangements of other embodiments of connectors.

A high power optical cable 206, having a high power optical fiber 207, is contained within the attachment member 212. The attachment member 212, may be a threaded pressure-fitting type device, such as for example a SWAGELOK, or other type of locking member, and attaches to and seals against the outer surface of the optical cable 206.

In the embodiment of FIGS. 5A to 5E, the optical cable is an optical fiber having a core diameter of about 600 µm, (microns), a cladding thickness of about 30 µm, and an acrylate coating thickness of about 75 µm. The optical cable may be an optical fiber with any added outer protective layers. It may be, for example, any of the configurations disclosed and taught in US Patent Publication Nos. 2010/0044106, 2010/0215326, and 2012/0020631, the entire disclosures of each of which are incorporated by reference herein. Although a single optical cable is shown in the embodiment of FIGS. 5A to 5E, multiple optical cables may be utilized, or a single optical cable with multiple optical fibers may be utilized.

The high power passively cooled connector 200 has a body 216, having a housing, which in this embodiment has two housing sections 218, 220. Housing section 218 forms cavity 219 and housing section 220 forms cavity 221. Housing section 218 and housing section 220 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations thereof.

Housing section 220, which is adjacent to and forms a portion of the face end 202, has an outer surface having a predetermined shape, which has three sub-sections, front sub-section 222, middle sub-section 224, and back sub-section 226. Front sub-section 222 has an essentially cylindrical shape and has an end face 223, which forms a part of end face 202. Middle sub-section 224 has an essentially frustoconical shape. Back sub-section 226 has an essentially cylindrical shape having a larger diameter than front sub-section 222. Middle sub-section 224 is specifically configured to be the contacting, positioning and aligning surface with a receptacle (not shown in this figure).

As discussed above, the shape of the connector, or the outer shape of the housings, may vary depending upon the particular application, use, receptacle, tool and other design and use factors.

The housing 218 has an opening 210, which forms part of the cavity 219. The opening 210 is configured to receive and hold the member 212. The cable 206 extends through opening 210.

The cable 206 and the optical fiber 207 are affixed and held within the body 216. Although not utilized in this embodiment, a protective member, such as a TEFLON tube, or other means to protect the fiber, may extend into and beyond the opening 215, and thus provide protection to the outer surface of the fiber from the edge of the stainless steel tube. The protective member, preferably may be located anywhere past the point of mechanical attachment and sealing by the members 212, 213 up to the adhesive dam 256. It being understood, that depending upon the type of attachment member, the type of optical cable, and other considerations, protective layers of the optical fiber, such as the TEFLON and stainless steel tubes in the embodiment of FIGS. 4A to 4F may be used and may end at different locations, the same locations, or other locations within, partially within, or outside of the connector body. Further, as disclosed and taught in US Patent Publication Nos. 2010/0044106, 2010/0215326, and 2012/0020631, the entire disclosures of each of which are incorporated by reference herein, other protective layers or material than TEFLON, or in addition to TEFLON, may be employed.

In the embodiment of FIGS. 5A to 5E, the optical fiber 207 extends through the cavities 219, 221 of the body 216 and housings 218, 220. The optical fiber 207 extends through these cavities 219, 221 and is formed into a quartz block 240 that permits a reduction, or stepping down, in the fluence of the laser beam from the core of the fiber to the face 241 of the block 240. The fiber 207 is in optical communication with the end of the quartz block 240, preferably by way of a fusion splice joining the fiber to quartz block 240; other means to optically and mechanically connect or associate the fiber to the block may be employed. To accommodate high g-loads, preferably, a strong mechanical connection, and support for that connection, as discussed herein should be employed. The optical fiber exiting the opening 210 and going into cavity 219 has its core, cladding and acrylate coating. The optical fiber 207 extends through the adhesive dam 256, spring 252 and into and through adhesive dam 250. At about the location of the epoxy 266, the acrylate coating is removed from the optical fiber leaving the core and the cladding. The optical fiber, having the core and cladding extends from the epoxy 266 through the remainder of cavity 221 to the end of the quartz block 240. (In this embodiment the end of the quartz block 240 that is attached to the fiber 207 would be the proximal end; however, if this connector were used, for example, as part of a coupler, then this end of the quartz block could be the distal end of the quartz block and the face 214 could be the proximal end of the quartz block.) The adhesive dams 256, 250, and 248 have springs 246 and 252 associated with them. It being understood, that depending upon the type of attachment member, the type of optical cable, and other considerations, the coating of the optical fiber, such as the acrylate coating, in the embodiment of FIGS. 5A to 5E, may end at different locations, the same locations, or other locations within, partially within, or outside of the cavity or connector body.

The optical fiber 207 extends through spring 252, adhesive dam 250, cavity 221, adhesive dam 248, spring 246, spacer 244, ferrule 242, and to quartz block 240.

One manner, by way of example, in which the components may be assembled, is to fuse an end of the optical fiber 207 to the end of the quartz block 240. The other end of the optical fiber 207 is then slid into the cavity through the various components, so that the end of the fiber extends out beyond the opening 215. The fiber would also be slid through the exterior members, positioning ring 258, and locking ring 260, with these components at some point being attached to the exterior of the housing. (By saying sliding the fiber through the components, it should be recognized that the components may also be slid over the fiber) At which point in the assembly process, the general amount of extra fiber length to accommodate expansion and contraction the housing 218 is determined and that length of fiber is positioned in the corresponding cavity in the final product by the epoxy 266 and members 212, 213.

Attachment member 212 and cover 213, however, may simply function as pass through members, to provide for and accommodate thermal expansion issues. In this configuration, the positioning member 258, or other means (not shown in the figure) of holding and affixing the tail end 204 of the connector may be employed to prevent the fiber from being broken or damaged during operation.

A locking ring 228 engages a ledge 274 and a portion of the surface of the quartz block 240. The locking ring 228 has openings 229 for receiving a tool for placing and tightening (threading) the locking ring in place within the cavity 221. In this manner the locking ring 228, has an end face 231, which forms a portion of the face end 202 and the opening in the locking ring 228 forms the opening 208 of face end 202. Other forms of attaching the locking ring may be employed.

When the locking ring 228 is tightened and in engagement with ledge 274 and quartz block 240 the other components, i.e., ferrule 242, and spacer 244 are forced against spring 246, creating a preload on those components, as well as, providing a force against dam 248 holding it in place against a ledge in the cavity 221.

Epoxy 266 is used to hold the fiber 207 in place with respect to the body 216 and in particular the engagement section 224 of the connector 200. The epoxy is added to the cavities 221 through ports. Preferably the portions of cavities 221 between dams 248, 250 is completely filled with epoxy providing for the secure attachment of the fiber to the housings 220 and body 216 of the connector 200. In this embodiment only one cavity, 221 contains epoxy, the other cavity although capable of containing epoxy is not filled with epoxy to provide for extra fiber length as discussed above. Once the epoxy has been added setscrews 254 are inserted into all of the ports sealing them. In this manner the ports do not form an opening connecting the cavity or the inner portions of the housing to the outside of the housing. The ports, being so plugged, are incapable of transmitting or conveying a cooling fluid. The ports may also be plugged with epoxy or by other means.

Although not specifically shown in the figures, break detection and back reflection monitoring devices and systems may be utilized with, or integrated into, the connectors and the high power optical cables. Examples of such break detection and monitoring devices, systems and methods are taught and disclosed in U.S. Patent Application Ser. No. 61/446,407; and Ser. No. 13/403,723, and US Patent Application Publication No. 2010/0044106, the entire disclosure of each of which are incorporated herein by reference.

The spacer 244 may be made from for example a metal, a ceramic, a composite material, a glass, fused silica, sapphire, a polycrystalline structure, a thermoplastic, or other suitable types of material. In the embodiment of FIGS. 5A to 5E the inner wall of the spacer is configured to align and center the fiber 207, ferrule 242 and quartz block 240 assembly. The spacer 244 may also be configured to function as a mode stripper, by having it configured to be in optical association with the fiber, and have a nano-particle mode stripper associated with it. For example, the spacer 224 may be configured along the line of the embodiment of FIG. 1.

The ferrule 242 may be made from, for example, a metal, a ceramic, a composite material, a glass, fused silica, sapphire, a polycrystalline structure, a thermoplastic, or other suitable types of material. In the embodiment of FIGS. 5A to 5E, the inner wall of the ferrule is adjacent the outer surface of the fiber. The ferrule may function as a mode stripper, and have a nano-particle mode stripper associated with it, either by removing some, and preferably the majority of back reflections propagating along the cladding from the distal end to the proximal end, or in the case of a non-transmissive material absorbing the back reflection energy that escapes from the cladding and conveying the heat thus generated to the exterior of the housing. The ferrule can be a mode stripper of the type of the embodiment of FIG. 1. Thus, for example, the outer surface of the fiber may be etched to facilitate the escape of back reflections from the cladding, or the inner surface of the ferrule may be in optical contact with the outer surface of the fiber, and the index of refraction of the ferrule may be such as to cause back reflected light to escape from the cladding into the ferrule, which in turn would transmit these back reflections to be absorbed by the inner walls of the housing, to be diffused by the outer surface of the ferrule and combinations of these and other manners of managing back reflections and their related energy that is removed from the cladding in this location.

The thermal properties of the ferrule 242, and the spacer 244, preferably are closely matched to that of the fiber 207, and that of the housing 220, respectively. However, in the FIGS. 5A to 5E embodiment, the connector design is capable of using materials having a considerably different CTE from the fiber. This is accomplished by having the fiber fixed at the epoxy section 266, but only being slideably engaged with the ferrule 242, and the spacer 244. In this manner, the different CTE of the structures associated with the fiber, from the fibers point of fixation in the housing to the face 241 of the quartz block 240 will not put stress upon or break the fiber or the quartz block as those structures expand and contract at different rates from the fiber over the range of operating temperatures of the connector.

The spacer 244 may further be shaped and coated in such a manner as to redirect any back reflections that are present in the ferrule 342 back out the face of the connector.

Turning now to the face end 202 of the connector 200, there is provided a novel configuration for the launching of the laser beam along a beam path 290 from the fiber 207 through the quartz block 240 out the quartz block face 241 and thus from the connector face end 202. The fiber 207, which in this embodiment consists of a core and a cladding, extends to and is fused with the quartz block 240. The quartz block face 241 in this embodiment may be a flat surface, it may be polished, it is preferably perpendicular to the sides and longitudinal axis of the fiber, and the connector. It may also have a predetermined shape, such as a sphere, a curve, or function as a lens or other optic that shapes or affects the properties of the laser beam.

The locking ring 228 has an inner surface; in this embodiment the inner surface has two section, conical surface 268, and annular surface 269. These inner surfaces engage the surfaces of the quartz block to align, center and hold it in place. The locking ring 228 further engages ledge 274, which is located in housing section 220. To accommodate higher g-loads and reduce or eliminate a point of mechanical stress the ends of ferrule 242 are configured to provide for a space or void 262 between the ferrule and the quartz block adjacent to the inner wall of the housing 221.

As is illustrated by the beam path 290, the beam has a substantially larger surface area, e.g., bigger spot diameter, when it leaves the face 241 of the quartz block 240, than when it leaves the fiber. By increasing the spot diameter at the face of the quartz block, the fluence of the beam is reduced and the ability of the connector to handle contamination on the face where the beam is launched is enhanced.

Further, the larger surface area for the laser beam launch point makes the application of antireflective and other coatings easier to apply.

In addition to using quartz, the block 240 may be made from sapphire, Infrasil, Suprasil, diamond, calcium fluoride, zirconium floride, or other glass, fused silica and other highly transmissive materials for the selected wavelength.

The proximal side 280 of the quartz block may be used to play a significant role in the management of back reflections. Preferably, this surface is used to reflect back reflections entering the face 241 of the quartz block back towards that face, and thus, may among other things reduce, lessen the chance of, or prevent them from entering either the core of the fiber 207, the cladding of the fiber 207, or the connector body 216. An anti-reflective coating may be used on the surface 241 while a reflective coating may be used on the surface 280. The difference in the indices of refraction for the quartz block 240 and the ferrule 242 may also be selected to enhance the reflection of back reflection from the surface 280. Care, however, should be taken, as the opposite effect may occur, i.e., the funneling of light into the fiber, under certain conditions of configurations, e.g., spacing, sizes and angles of the components. (The funneling effect may be utilized in a connector that is intended to have its face end function as the proximal end, e.g., beam receiving end, in a coupler system.) Additionally, the shape of these surfaces, their angle may be varied to enhance this ability to handle back reflections by returning them to forward propagation. Thus, this system has the added advantage of not only preventing or reducing the risk of back reflections entering the fiber and damaging the connector or other optical components further proximal to the connector, it provides for a more efficient connector and the energy from back reflections is not lost but directed back in the direction of the beam, i.e., toward the distal face of the connector. It is further noted that this surface 280 of the quartz block, as well as, the other surfaces of the quartz block, do not require active cooling and are not in direct fluid communication with any cooling channel, passage or media. In a like manner the ferrule 242 and the spacer 244 do not require active cooling and are not in direct fluid communication with any cooling channel, passage or media.

The surface 280 could also functions as a diffuser, diffusing back reflections and propagating them into ferrule 242 where they would be absorbed and the resultant heat conveyed by the ferrule to the housing or reflected in the manner above described.

In the embodiment of FIGS. 5A to 5E the face of the quartz block is only slightly, less than about 0.1 mm, more preferably about 0.5 mm, recessed from the surface 223. The amount of recess could be greater, although that may make cleaning more difficult, as well as provide a dead space for accumulating debris. The quartz block could also be configured such that its face 241 is coplanar with surface 223, or extends out beyond surface 223 of the end face 202 of the connector 200.

Cooling fins, or flutes 264 are positioned along the outside of the housing. These fins assist in heat management and dissipation and may or may not be present and may vary in size, shape and number.

Thus, connectors of the type as shown in the embodiment of FIGS. 5A to 5E do not require, and are configured without the ability to have, active cooling, e.g., they do not have the capability of flowing a cooling liquid through the interior of the housing, the cavities, or in direct contact with the fiber or optical components. Further, the location of the epoxy, the housings outer shape, and other features described above enable the connector to operate over a wide range of vibrations, temperatures and laser powers, including by way of example about 21 kW, 250 g's, 150° F., to about 50 kW, 500 g's, 400° F.; while maintaining, or substantially maintaining, its beam quality, beam parameters, and its optical distance from and position with respect to a receptacle and the receptacle associated optics, tools, etc.

Turning to FIGS. 3A to 3C there is provided an embodiment of a passively cooled high power connector 300. In general, the connector 300 has a face end 302 and a tail end 304. The face end 302 has an opening 308 through which a laser beam is launched, along a laser beam path. The tail end 304 has an opening 314. The tail end opening 314 is formed by an attachment member 312. An outer member, cover, attachment, or locking member 313 having opening 315 is also provided in this embodiment.

A high power optical cable 306, having a high power optical fiber 307, is contained within the attachment member 312. The attachment member 312, may be a threaded pressure-fitting type device, such as for example a SWA-GELOK, or other type of locking member, and attaches to and seals against the outer surface, e.g., the steel tube, of the optical cable 306. Further, the outer attachment member 313 may be an additional or second attachment means, or may be the sole means of attachment.

Figure 6A:
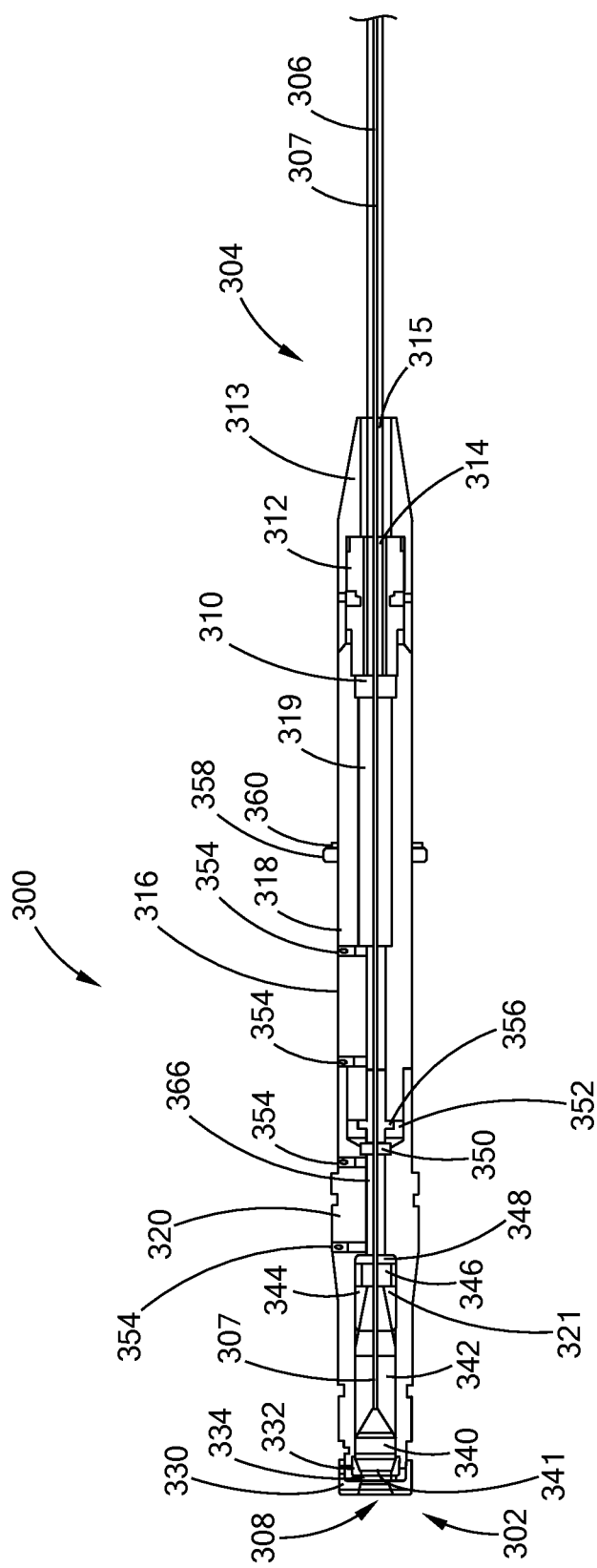
FIG. 6A is a cross-sectional view of an embodiment of a connector having a mode stripper in accordance with the present invention.
Figure 6B:
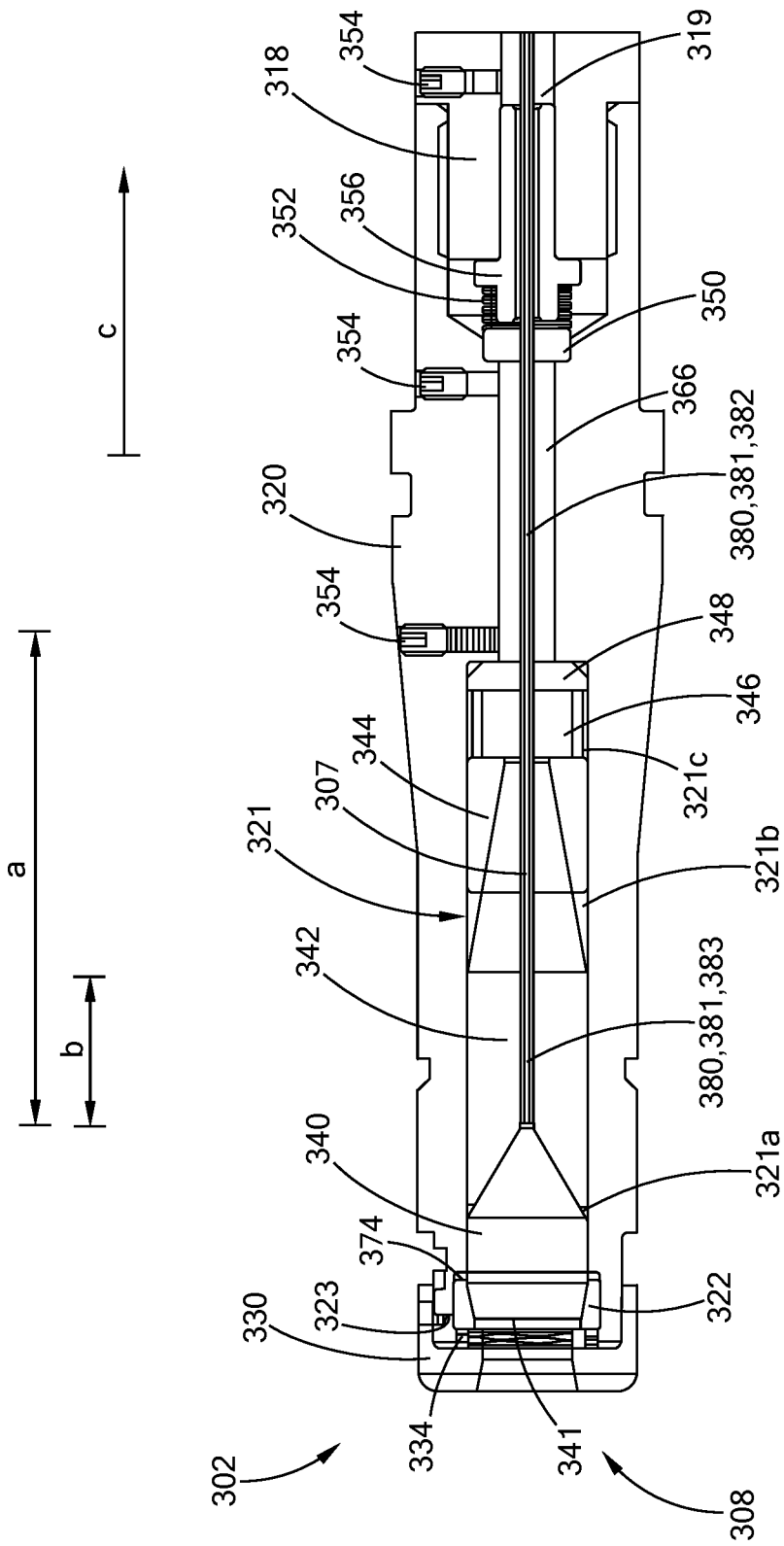
FIG. 6B is an enlarged cross-sectional view of the front end of the connector of FIG. 6A.
Figure 6C:
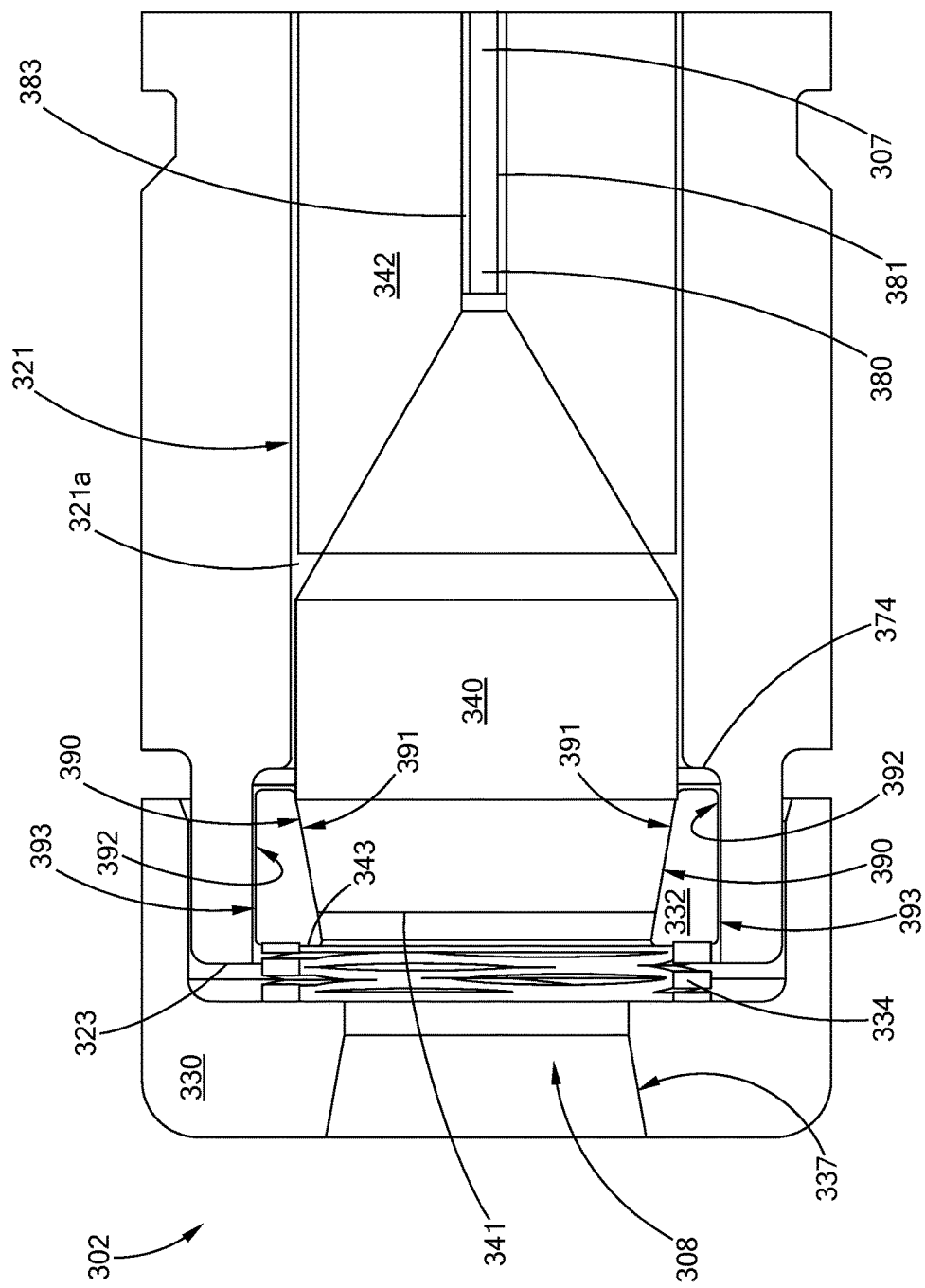
FIG. 6C is an enlarged cross-sectional view of the front end of FIG. 6B. FIG.

In the embodiment of FIGS. 6A to 6C, the optical cable is an optical fiber having a core diameter of about 600 μm, (microns), a cladding thickness of about 30 μm, and an acrylate coating thickness of about 75 μm. The optical cable may be an optical fiber with any added outer protective layers. It may be, for example, any of the configurations disclosed and taught in US Patent Publication Nos. 2010/0044106, 2010/0215326, and 2012/0020631, the entire disclosures of each of which are incorporated by reference herein. Although a single optical cable is shown in the embodiment of FIGS. 6A to 6C, multiple optical cables may be utilized, or a single optical cable with multiple optical fibers may be utilized.

Although not specifically shown in the Figures, break detection and back reflection monitory devices and systems may be utilized with, or integrated into the connectors and the high power optical cables. Examples of such break detection and monitoring devices, systems and methods are taught and disclosed in U.S. Patent Application Ser. No. 61/446,407; and Ser. No. 13/403,723, and US Patent Application Publication No. 2010/0044106, the entire disclosure of each of which are incorporated herein by reference.

The high power passively cooled connector 300 has a body 316, having a housing, which in this embodiment has two housing sections 318, 320. Housing section 318 forms cavity 319 and housing section 320 forms cavity 321. Housing section 318 and housing section 320 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations and variations thereof.

Housing section 320, which is adjacent to and forms a portion of the face end 302, has an outer surface having a predetermined shape, which has three sub-sections, front sub-section, middle sub-section, and back sub-section along the lines of the outer housing in the FIGS. 2A to 2E embodiment. As discussed above, the shape of the connector, or the outer shape of the housings, may vary depending upon the particular application, use, receptacle, tool and other design and use factors.

The housing 318 has an opening 310, which forms part of the cavity 319. The opening 310 is configured to receive and hold the attachment member 312. The cable 306 extends through opening 310.

The optical fiber 307 is affixed and held within the body 316. Although not utilized in the embodiment of FIGS. 6A to 6C, a protective member or layer may extend into and beyond the opening 315, and thus provide protection to the outer surface of the fiber from the edge of the stainless steel tube. Examples of such protective members or layers are disclosed and taught in US Patent Publication Nos. 2010/0044106, 2010/0215326, and 2012/0020631, the entire disclosures of each of which are incorporated by reference herein.

In the embodiment of FIGS. 6A to 6C, the optical fiber 307 extends through the cavities 319, 321 of the body 316 and housings 318, 320. The optical fiber 307 extends through these cavities 319, 321 and is formed into a quartz block 340 that permits a reduction, or stepping down, in the fluence of the laser beam from the core of the fiber to the face 341 of the block 340. The fiber 307 is in optical communication with the end of the quartz block 340, preferably by way of a fusion splice joining the fiber to quartz block 340; other means to optically and mechanically connect or associate the fiber to the block may be employed. To accommodate high g-loads, preferably, a strong mechanical connection, and support for that connection, as discussed below should be employed.

The optical fiber exiting the opening 310 and going into cavity 319 has its core, cladding and acrylate coating. The optical fiber 307 extends through the spring seat 356, spring 352, epoxy dam 350, epoxy filled section 366, epoxy dam 348, spacer 346, aligner and spacer 344, ferrule 342, to quartz block 340. In this embodiment there is one spring 334 positioned distally to the quartz block.

In the embodiment of FIGS. 6A to 6C, an over-clad 383 is placed on the fiber. The over-clad 383 may be a capillary through which the fiber 307 is extended. The overclad 383 may be made from fused silica, sapphire, quartz, epoxy, plastic, diamond, ceramic, or other substantially transmissive materials. Preferably the overclad material has an index of refraction that is higher than or equal to the index of refraction of the outermost cladding of the fiber. The overclad may also be used to enhance, or increase the mechanical strength of the quartz block fiber assembly. Preferably, the overclad should have the same or substantially the same CTE as the fiber.

In FIG. 6B there is provided the relative longitudinal location and area of fixation, of the overclad 383, with respect to the fiber core 380, fiber cladding 381, and fiber coating 382. Thus, for the length shown by line "b" the overclad 383 is preferably fused to the fiber cladding 381. The overclad 383 preferably extends over the fiber 307 for the length shown by line "a". As such, in a preferred embodiment, the majority of the overclad 383 is not fused to the fiber. Further, in the length "a" the fiber 307 does not have any coatings, such as an acrylate coating. In the preferred embodiment that coating 382 is located along length "c". It being understood that these lengths, relative positions, and overlaps may change depending upon the nature of the fiber, overclad and coatings.

One manner, by way of example, in which the components may be assembled, is to fuse an end section "b" of the overclad 383 to the fiber 307. The fused assembly of overclad and fiber would then be heated in conjunction with the heating of the stem of the quartz block. These two heated members would then be brought together in a precise manner, by for example, the use of a VYTRAN machine, and fused together. Other machines and apparatuses for making these junctions are available and may be used, such as the AFL ARCMASTER.

Set screws 354 are used to plug epoxy fill ports or passages; sealing and isolating these passages and the cavities 319, 321 from the outside of the housing. Thus, a fluid flowing along the exterior of the housing could not enter into the cavities or the interior of the housing.

To reduce stress points in the assembly, the edges of the components are configured to provide voids, or open spaces 321a, 321b, and 321c.

The face end 302 of the connector 300 has a face end cap 330, an annular retaining wedge 332, and a spring 334. The housing 320 has an end face 323 and a ledge 374. The face end cap 330 is attached to the end of the housing 320. The end cap 330 may be threaded on, attached by pins, detents, or other means of fixedly or releasable securing the cap to the housing. The cap may engage either or both ledge 374 or face 323, or as shown in the figure, it may be adjacent to but not mechanically touching those structures. The cap 330 exerts a force against spring 334, which in turn exerts a force against annular wedge 332. The inner surfaces 390 of the wedge 332 are forced against the outer surfaces 391 of the quartz block 340 and the outer surfaces 392 of wedge 332 are slideably engaged with the inner surfaces 393 of the housing 320 aligning the quartz block 340 in place with respect to housing 320, but still allowing for axial thermal expansion differences. In this embodiment the wedge and the spring do not engage or contact the face 341 of the quartz block 340 from which the laser beam is launched. The face 341 may have an antireflective, v-coat, long wave reflective, long wave cut-off, hot mirror, bandpass, or other coating.

In this embodiment, because the index of refraction of the overclad is higher than or equal to the index of refraction of the fiber outer cladding, the overclad 383 acts as a mode striper, removing back-reflected light from the cladding, before that light reaches a section of the fiber where the coating is present. A fused silica spheres transparent medium mode stripper can also be used at this location.

In an embodiment nanoparticles without a medium such as the Sodium Silicate can be utilized. In this embodiment a heating source, such as a $CO_2$ laser can be used to bond the particles to the fiber (and each other if glass) via melting the glass very slightly with the $CO_2$ pulse or illumination. In some of these embodiments they could be viewed as a bulk bonding attachment for the particles. Thus, there is provided mode strippers having nanoparticles fused into, or integral with the, structure or material of a cladding layer or outer layer.

In an embodiment the fiber itself is the mode stripper. In this embodiment a multi-clad evanescent coupling fiber design would be used, which also would control how the cladding light is removed from the clad in a controlled manner. Thus, turning to FIG. 12 there is shown a perspective (partially exposed) view of such a mode stripper fiber assembly 2500. The mode stripper fiber assembly 2500 has: an inner core 2506, e.g., 600 μm diameter fused silica; a clad 2505, e.g., a 660 μm outer diameter fluorine doped cladding; a secondary annular core 2504, e.g., a 720 μm outer diameter fused silica; a secondary clad 2503, e.g., 740 μm outer diameter fluorine doped cladding; a evanescent coupling layer 2502, e.g., an acrylate coating layer; and a outer protective layer 2501, e.g., a clear Tefzel butter coating.

Figure 12:
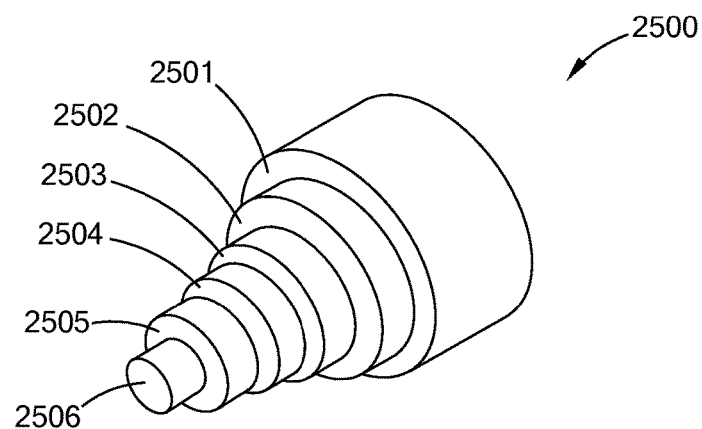
FIG. 12 is a perspective view of an embodiment of a mode stripper fiber in accordance with the present inventions.
Figure 13:
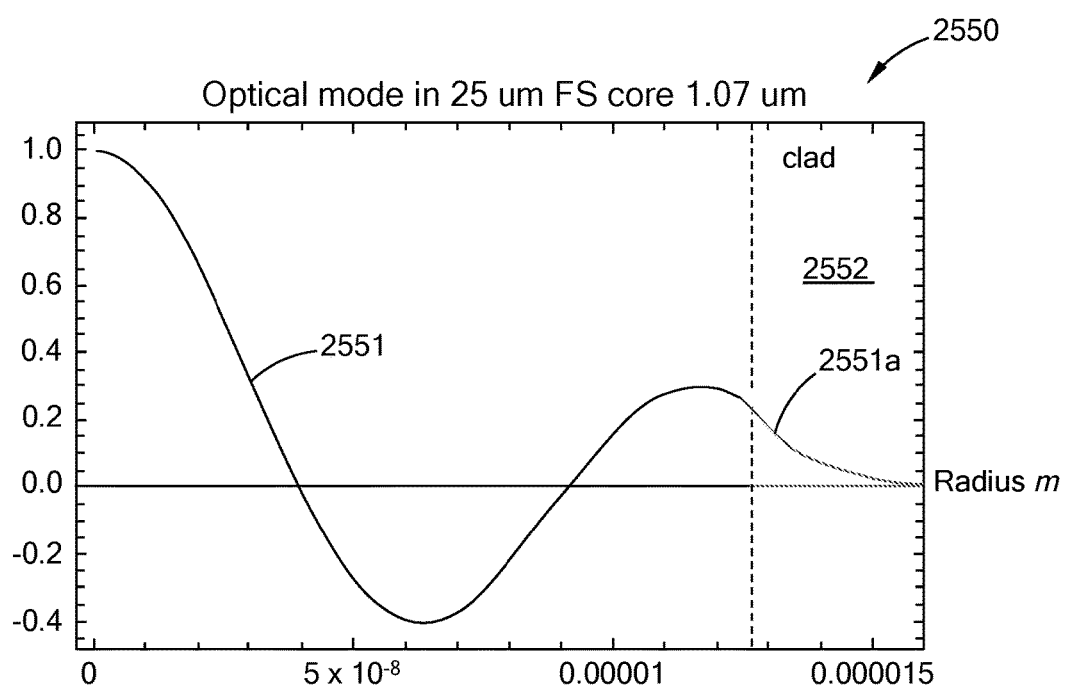
FIG. 13 is a graph illustrating the decay of the optical mode in the cladding of an embodiment of a mode stripper in accordance with the present inventions.

Thus, in the embodiment of FIG. 12, the cladding power is controlled through the use of multiple clad fiber, in which the clads are separated by a second annular core. In this manner the evanescent field only weakly interacts through the outer cladding 2503 with the coating layer 2502. This effect is shown in FIG. 13, in which a plot 2550 of the optical mode 2251 decay as it passes into the outer cladding 2552. The decay of the optical mode in the outer cladding is show by section 2551a.

In the embodiment of the mode stripper of the type of FIGS. 12 and 13, a fiber has a secondary fused silica core with a thin outer cladding (e.g., 2503) with a lower index of refraction and thus can trap light (e.g., power) from the inner cladding. This thin outer cladding can have a thickness (i.e., distance between the inner diameter and outer diameter of the cladding layer) of about 20 μm or less, about 10 μm or less and preferably for larger core diameter (e.g., 400 μm to 700 μm) fibers, about 5-10 μm. In this manner the outer cladding (e.g., 2505) allows coupling of laser power from the secondary core (e.g., 2504) to the acrylate coating (e.g., 2502), via evanescent wave coupling. The evanescent wave coupling creates a loss mechanism for power trapped in the secondary core (e.g., 2503). The thickness of the outer cladding can be based upon the desired level of loss which prevents propagation of laser power in the outer cladding but also controls the deposition process to provide for predetermined heat transfer and thus prevent unwanted heating effects in the fiber coating. Thus, FIG. 13 illustrated the decay of the optical mode in the fiber cladding 2552 by line section 2551a. The extent to which the field propagates through the cladding is dictated by several factors, including without limitation, propagation constants in the fiber and cladding as well as cladding thickness. This embodiment allows for the cladding mode stripper to have very long absorption path lengths, e.g., 10 m, 20 m, 50 m, 100 m, and greater and lesser path lengths or distances.

A fiber that has a non-light transmitting cladding, e.g., no light is transmitted out of the distal end of the cladding layer(s), delivers light only through the fiber core, and thus the fiber core defines the numerical aperture (NA) brightness output at the distal end of the fiber.

In a preferred embodiment for higher power applications, e.g., 10 kW, 15 kW, 20 kW and greater, the acrylate coating is preferable a high temperature acrylate (HTA) to handle the heat load in the fiber.

In embodiments of this evanescent mode stripping fiber, the inner fiber core can be about 400 µm, about 500 µm or about 600 µm and the outer cladding layer can have a thickness of about 6.5 µm, 8.5 µm or 10 µm.

In embodiments, the particles are selected to have refractive indices that alter the coupling from the cladding. In this manner, and for these embodiments, it is theorized that the mode stripper does not explicitly absorb large amounts of the light; instead only a small portion is absorbed. Thus, transparent particles are used and absorption by those particles is limited, e.g., about 10% to 20%, or less of the light entering the medium having the nano-particles is absorbed. The transparent particles used to, and create preferably a predetermined and controlled amount of scattered light, at least about 40%, at least about 50%, at least about 80%, at least about 90% or more, of the light energy entering the stripper is scattered. Through this altered coupling to create scatter, with minor absorption, the control of, and the distribution of, the light removed from the cladding along the fiber length can create the predetermined, and desired, thermal profile for the mode stripper.

Figure 7A:
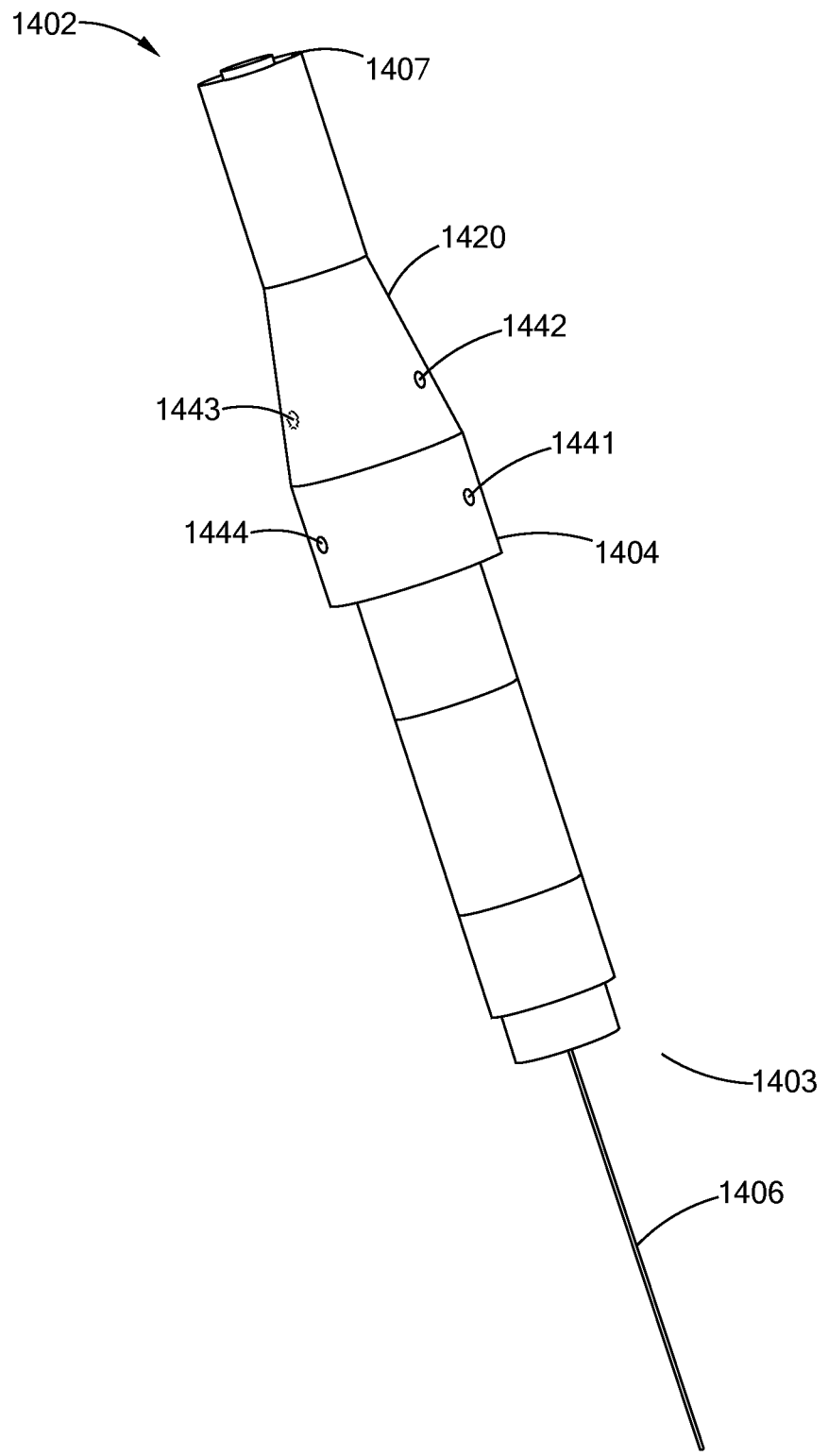
FIG. 7A is a side perspective view of an embodiment of a connector having a mode stripper in accordance with the present invention.
Figure 7B:
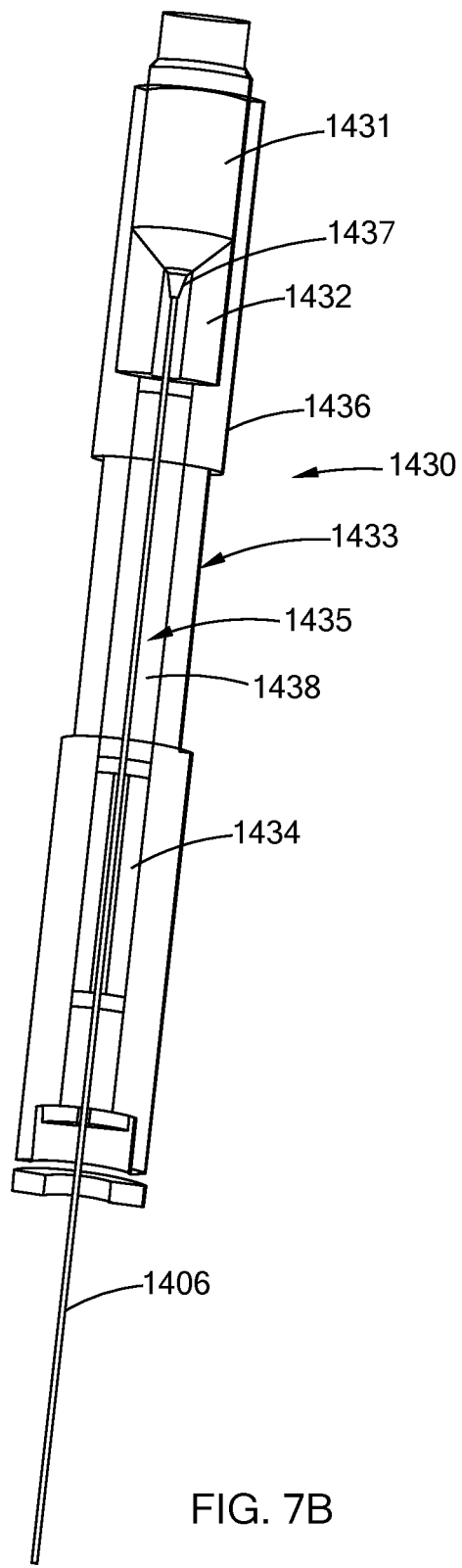
FIG. 7B is a side perspective view of the optical assembly of connector of FIG. 7A.
Figure 7C:
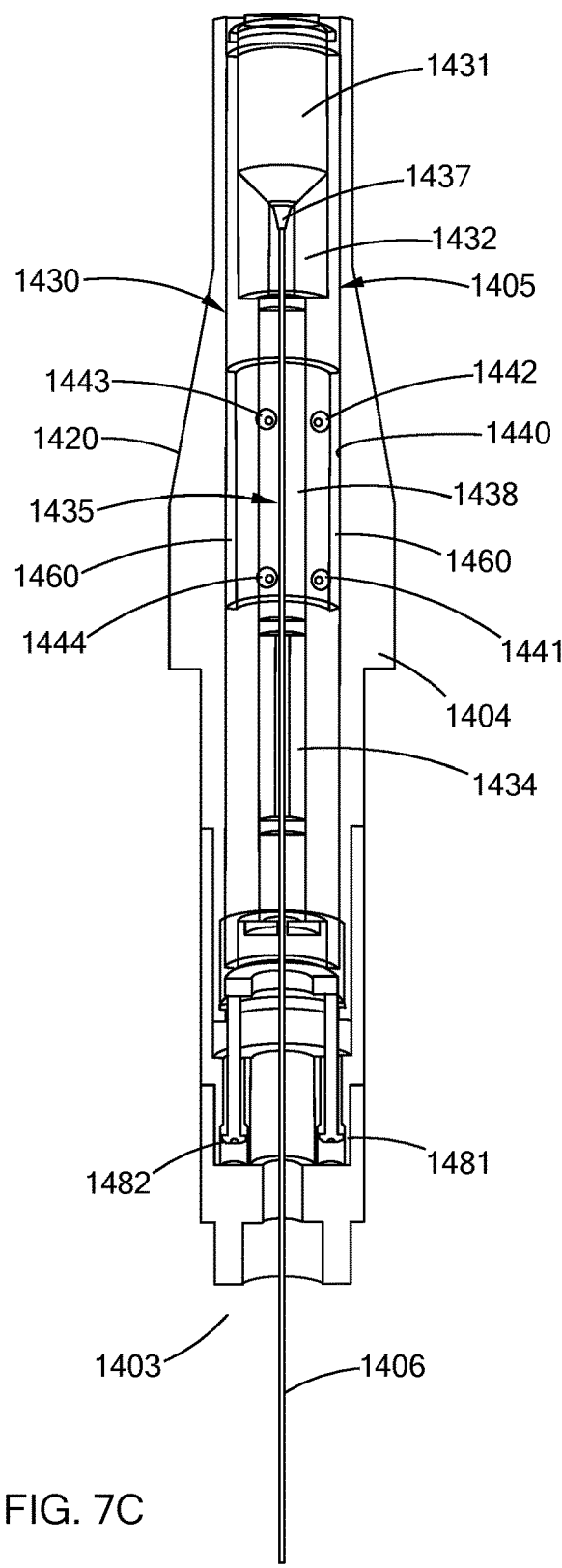
FIG. 7C is a partial cross-sectional perspective view of the embodiment of FIG. 7B.
Figure 7D:
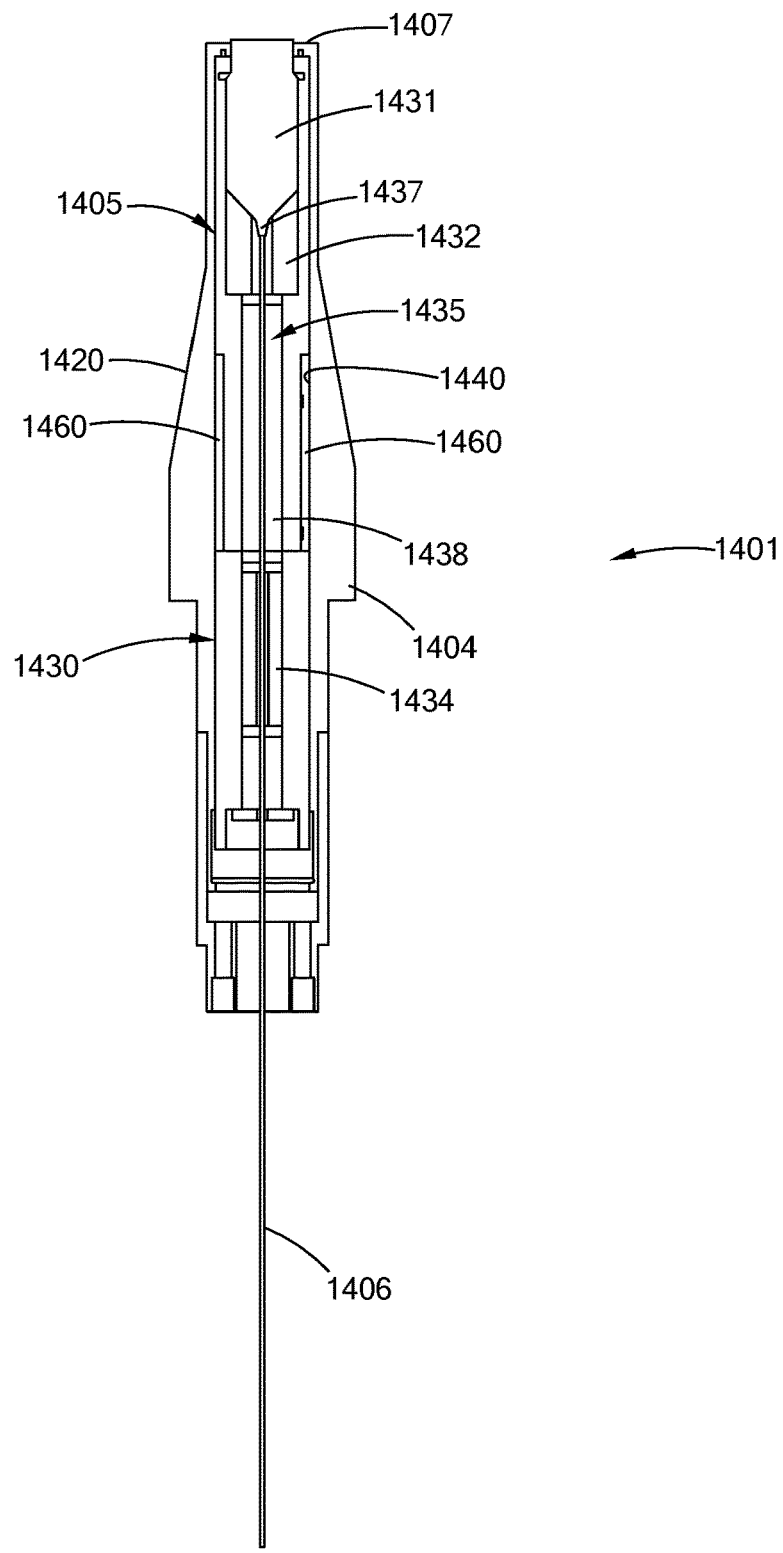
FIG. 7D is a cross-sectional view of the embodiment of FIG. 7C.

FIGS. 7A to 7D, show an embodiment of a connector having an alignment adjustment assembly. FIG. 7A provides a side prospective view of the connector. FIG. 7B is a side prospective view of the optics assembly or optical path components. FIG. 7C and FIG. 7D illustrate the optical path components within the connector body. In FIG. 7C the outer connector components are shown in side cross-sectional view to expose the inner optical path components, which are shown in prospective view. In FIG. 7D the entire connector is shown in cross-sectional view.

The connector 1401 has a face end 1402 and a tail end 1403, having an optical cable 1406 extending therein. In this embodiment the optical cable is an optical fiber, but could be other configurations including the other configurations provided herein.

The connector has a body having a housing 1404 that forms a cavity 1405 that holds an optical assembly 1430. The face end 1402 has a face end surface 1407, which in this embodiment is also the distal end surface of housing 1404. The housing 1404 has an outer engagement surface 1420, which provides an engagement, alignment surface for the connector when it is optically coupled to a receptacle, another connector, a tool or another device.

The optical assembly 1430 for the connector 1401, may include an optical expander block 1431, e.g., a quartz block, a block alignment and positioning sleeve 1432, a section 1435, an optics assembly alignment section 1433, an epoxy section 1434, an optical fiber 1406 and an outer ferrule 1436, and when incorporated into the housing the optical expander block 1431 may extend beyond the end surface 1407.

The quartz block 1431 has a stem 1437 having a frustro-conical shape. The quartz block 1431, extends distally substantially beyond the end of outer ferrule 1436. The above descriptions of blocks, shapes, materials and the methods of attaching the fiber to the quartz block are applicable to this embodiment. The use of a glass overclad may also be employed.

The block alignment and positioning sleeve 1432 is similar to the sleeves in the above embodiments, and the disclosures for those embodiments are applicable to this embodiment. The interface, e.g., conical surfaces between the quartz block 1431 and sleeve 1432 may be coated and configured to manage back reflections along the lines and in the manner as describe above. The sleeve may also be configured to function as a mode stripper, to remove or handle back reflections in the cladding. A mode stripper of the present inventions, such as for example, the embodiment of FIG. 1, 9 or 11, may be used. Additionally, the sleeve may be used solely, or in conjunction with another optical element such as the quartz block, as a means to lower the ultimate fluence of scattered, incoupled, or back reflected light onto a reflective or absorptive, or partially reflective or absorptive, element below the damage threshold of that element. For example, in this embodiment, the quartz block conical surface is a ground finish, which acts as a diffusing or scattering element to coherent or non-coherent impinging light. The length of the sleeve is selected such that light propagating beyond the quartz block, in the face to tail direction, has sufficient diffusion (lowering of fluence), such that when it reaches surfaces 1472, 1473 forming the interior of the outer ferrule, these surfaces 1472, 1473 are not exposed to a focused beam. These surfaces 1472, 1473 are preferably coated with a reflective coating, and the avoidance of contacting this reflective coating provides greater life for the coating and greater flexibility in the type of coating utilized. This method may be employed to lower the fluence on epoxy, an optical surface, a non-optical surface, etc.

The section 1435 is a predetermined length of fiber (core and cladding) that is in a cavity 1438 formed by the outer ferrule 1436. Cavity 1438 surrounds the fiber. The cavity 1438 may be filled with air. Preferably the fiber in this section and any sections distally from this section have only the core and cladding (including multiclads).

The epoxy section 1434 is similar to the epoxy sections for the other embodiments described above and those descriptions are applicable to this embodiment.

The outer ferrule 1436, preferably may be made from fused silica, although other strong materials such as metal and composites may be used. The use of fused silica provides mechanical CTE advantages as the CTE for the optics assembly components will all be similar, if not essentially identical.

The optics alignment section 1433, of the outer ferrule 1436, is made as a recess in the outer ferrule 1436 that corresponds with adjustment screws located in the housing 1404. The recess in the outer ferrule 1436 forms a cavity 1460 with the inner surface 1440 of the housing 1404. Openings 1441, 1442, 1443, 1444 in the housing 1404 contain adjustment screws. Once the adjustment screws are adjusted to align the optics assembly the cavity 1460 is filled with epoxy. In the configuration where the outer ferrule is fused silica, or another material that is transmissive to UV light, a UV curing epoxy may be employed. Near the tail end of the connector are recesses containing focusing adjustment screws 1481, 1482.

FIGS. 7C and 7D show a cross sectional view of the optics assembly 1430 associated with the housing 1404 and a see through cross-section view of the optics assembly 1430 associated with the housing 1404.

Many variations on the above detailed embodiments of the connectors, and combinations of the forgoing components for the above detailed embodiments are envisioned; and thus, it should be understood that in general some embodiments of connectors may have, for example: an outer jacket/alignment interface, which is a mechanical envelope for the optical components of the connector, protect it from mechanical damage, and has means to align and connect the connector to a tool, a device, or a receptacle; an internal alignment member, which aligns the optical fiber to the outer alignment interface datum, or other datum; a fiber termination, which is the end of the optical path in the fiber optic and may see the highest fluence surface and may also be the source of back reflections and loss; a heat sink, which transitions radiated energy (back reflections, heat from a work piece, other optical surface, and other sources of heat or light energy) and other generated heat to a cooling component; a fiber securing means, which locks the fiber (radially, axially, especially axially, and both) so that pull strength is retained, alignment is retained, and vibration is managed; a cable connection means, which enables connection to fiber cabling means; a passive cooling means, which removes heat from the connector to prevent overheating of components.

In general, additional components that may be utilized in some embodiments of connectors are for example: a back reflection management system, which addresses and manages back reflections generated from work piece, material being cut, material being drilled, rock face, fiber termination, or other source of back reflected light, that can be coupled into cladding and cause issues with coating, as well as heating issue for other components, the former may preferably be stripped from the cladding; an athermalizing means, which is provided to assist connector function and alignment through a range of operating temperatures; a low or lower-fluence optical face, (high fluence areas, in particular where contamination may be present or accumulate should preferably be minimized and more preferably avoided or protected); sealing components to protect the optical components from environment and operating conditions, such as, contamination and condensation and which further should be employed in higher fluence and sensitive areas; and, contamination protection means, which protect the optical face (beam launch surface or face, or beam receiving surface or face) from contamination when not installed in tool, receptacle or operating system. The techniques for managing back reflections may also be used for managing incoupled light sources from for example scatter from optics, or a misaligned incoming beam.

Figure 8A:
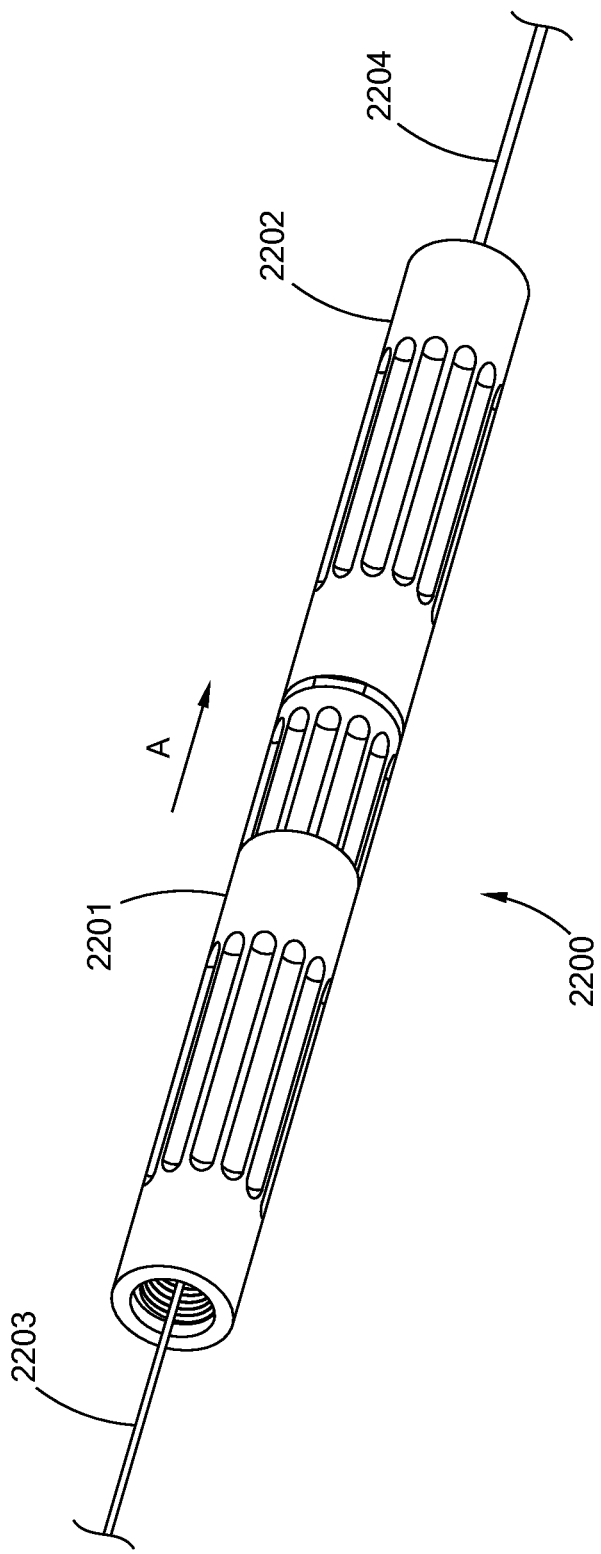
FIG. 8A is a perspective view of an embodiment of a fiber-to-fiber coupler having by a mode stripper in accordance with the present invention.
Figure 8B:
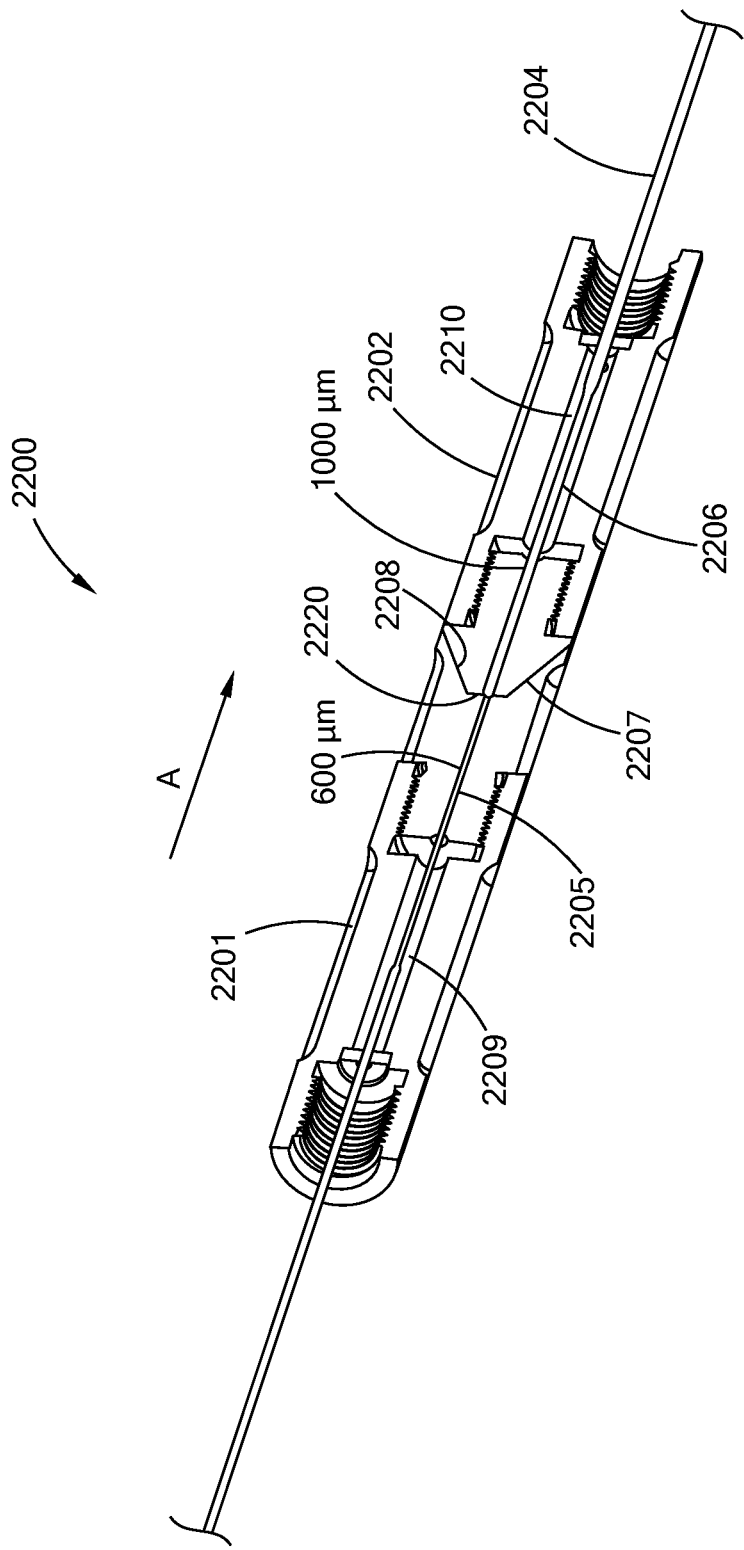
FIG. 8B is a perspective cutaway cross-sectional view of the embodiment of FIG. 8A.
Figure 8C:
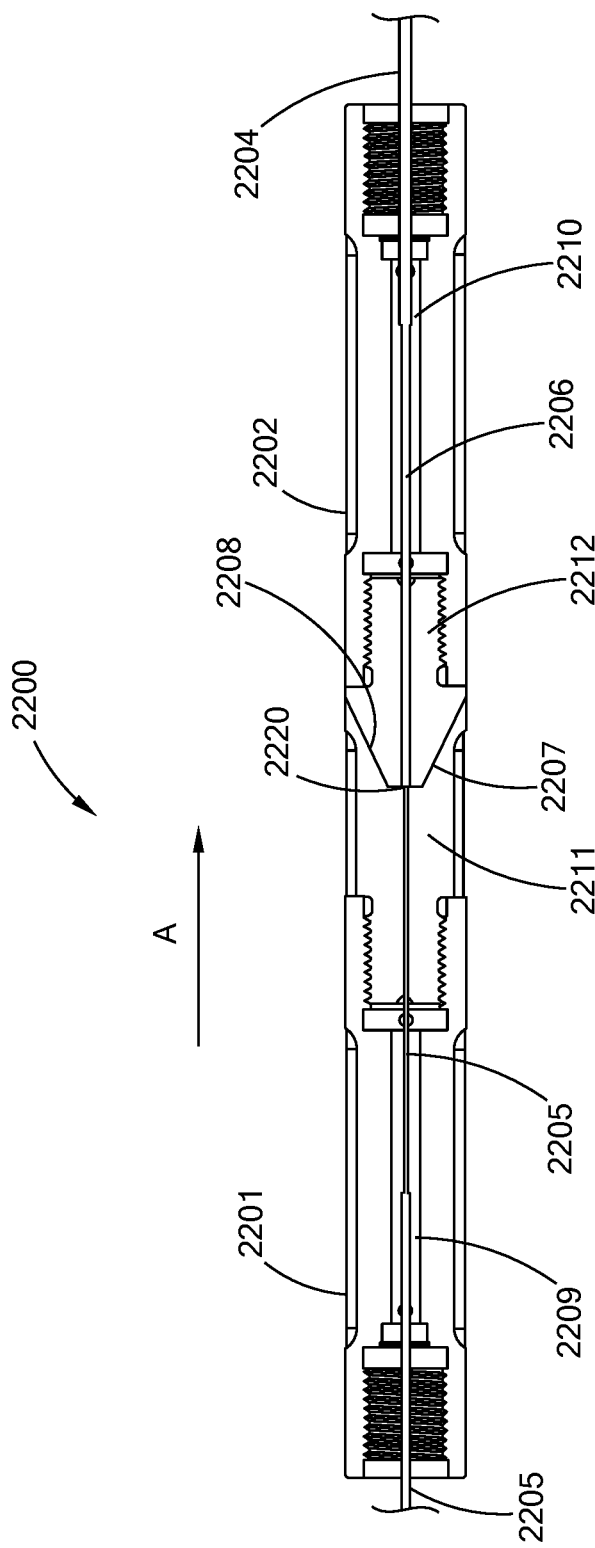
FIG. 8C is a cross-sectional view of the embodiment of FIG. 8A.

In an embodiment of a coupling assembly, utilizing the mode strippers of the present inventions is shown in FIGS. 8A to 8C. Thus, there is provided a first connector 2201 having a 600 μm core fiber 2203, which enters the connector through the proximal end (the laser beam is traveling in the direction of arrow A). The first connector 2201 is optically and mechanically associated with a second connector 2202, which has a 1000 μm core fiber 2204, which enters the connector through the distal end. The connectors 2201, 2202, each form half of a coupler 2200. FIG. 22B is a perspective cross-sectional view of the coupler 2200 and FIG. 22C is a cross-sectional view of the coupler 2200. The connectors 2201, 2202 have epoxy sections 2209, 2210 that hold and fix the fibers 2203, 2204. Preferably, the fibers 2203, 2204 have any coatings, such as a acrylate coating, removed and in sections 2205, 2206 only have their core and cladding(s). The distal end of connector 2201, has a concave shape 2207, that is configured for mechanical engagement with the convex shape, 2208 of the proximal end of connector 2202. The shapes and components of the mating distal and proximal ends of the connectors are designed to minimize thermal and vibrational effects and thus maintain the relative positions of the ends of the two fibers 2203, 2204 in substantial alignment. The faces of the ends of the two fibers are preferably only a few microns apart. The smaller core diameter fiber face is preferably the distal, or beam launch face, and the larger core diameter fiber face is preferably the proximal, or beam receiving face.

Other shapes for the mating surfaces of the coupler halves may be used. However, it is preferable that the concave shape be used for the coupler half that is least likely to collect debris, e.g., it is on the upper half if the coupler is positioned vertically during connection or disconnection. Additionally, mode strippers may be used, and could be located adjacent the fibers in sections 2211, 2212, in epoxy sections 2209, 2210 or both. For example, the mode stripper may be an etched outer clad of both fibers, it may be an epoxy that is optically transmissive, an epoxy that is capable of managing high heats, an epoxy that is index matched to the cladding and combinations of these, such as a mode stripper having nano-spheres. The face of the fibers may preferably be coated with an antireflective coating. The face of the fibers and in particular the face of the launching fiber may be a flat face, for example from cleaving the fiber, it may be polished, or it may be other shapes, for example it may have a predetermined shape to provide or affect the beam in a predetermined manner, such as a sphere, a curve, or to function as a lens or other optic that shapes, affects or both the properties of the laser beam.

By way of example, the laser systems of the present invention may utilize a single high power laser, or they may have two or three high power lasers, or more. The lasers may be continuous or pulsed (including, e.g., when the lasing occurs in short pulses, and a laser capable of continuous lasing fired in short pulses). High power solid-state lasers, specifically semiconductor lasers and fiber lasers are preferred, because of their short start up time and essentially instant-on capabilities. The high power lasers for example may be fiber lasers or semiconductor lasers having 1 kW, 5 kW, 10 kW, 20 kW, 50 kW, 60 kW, about 5 kW to about 60 kW, about 10 kW to about 40 kW, about 20 kW to about 60 kW, greater than 1 kW, greater than 10 kW and greater than 40 kW, and combinations and variation of these powers, and more power and, which emit laser beams with wavelengths in the range from about 405 nm (nanometers) to about 2100 nm, in the range of about 400 nm to 700 nm, in the range of about 390 nm to 600 nm, in the range of about 450 nm to 570 nm, about 500 nm, about 600 nm, in the range about 800 nm to about 1600 nm, about 1060 nm to 1080 nm, 1530 nm to 1600 nm, 1800 nm to 2100 nm, and more preferably about 1064 nm, about 1070-1083 nm, about 1360 nm, about 1455 nm, 1490 nm, or about 1550 nm, or about 1900 nm (wavelengths in the range of 1900 nm may be provided by Thulium lasers). Thus, by way of example, the present tools, systems and procedures may be utilized in a system that is contemplated to use four, five, or six, 20 kW lasers to provide a laser beam in a laser tool assembly having a power greater than about 60 kW, greater than about 70 kW, greater than about 80 kW, greater than about 90 kW and greater than about 100 kW. One laser may also be envisioned to provide these higher laser powers. Examples of preferred lasers, and in particular solid-state lasers, such as fibers lasers, are disclosed and taught in the following US Patents and Published Patent Applications: U.S. Pat. Nos. 8,511,401, 8,424, 617, 8,826,973, 8,571,368, 9,360,643, 8,662,160, Publication No. 2012/0074110, Publication No. 2016/0084008, and Publication No. 2017/0214213, the entire disclosures of each of which are incorporated herein by reference.

Figure 9:
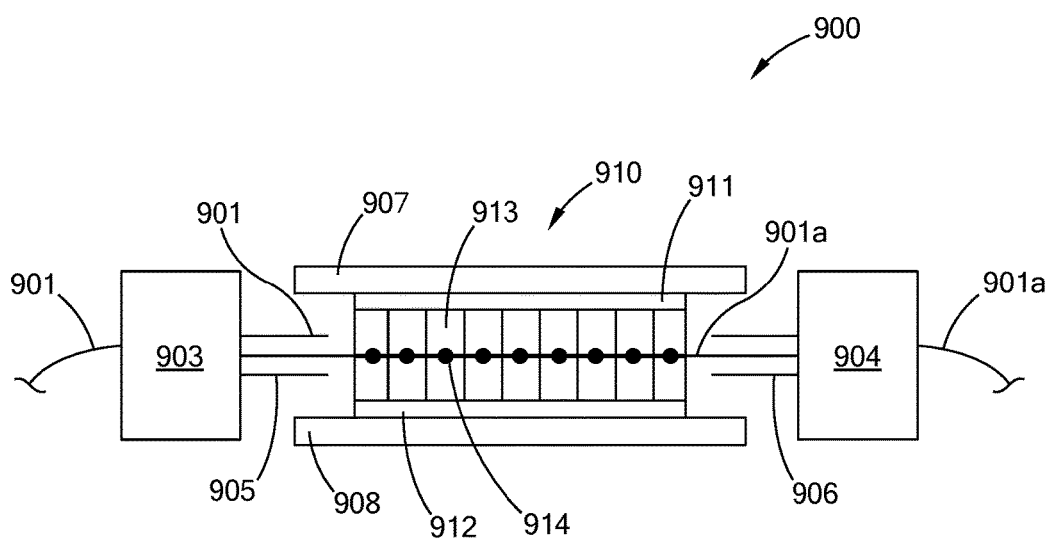
FIG. 9 is a schematic plan view of a mode stripper in accordance with the present inventions.
Figure 10:
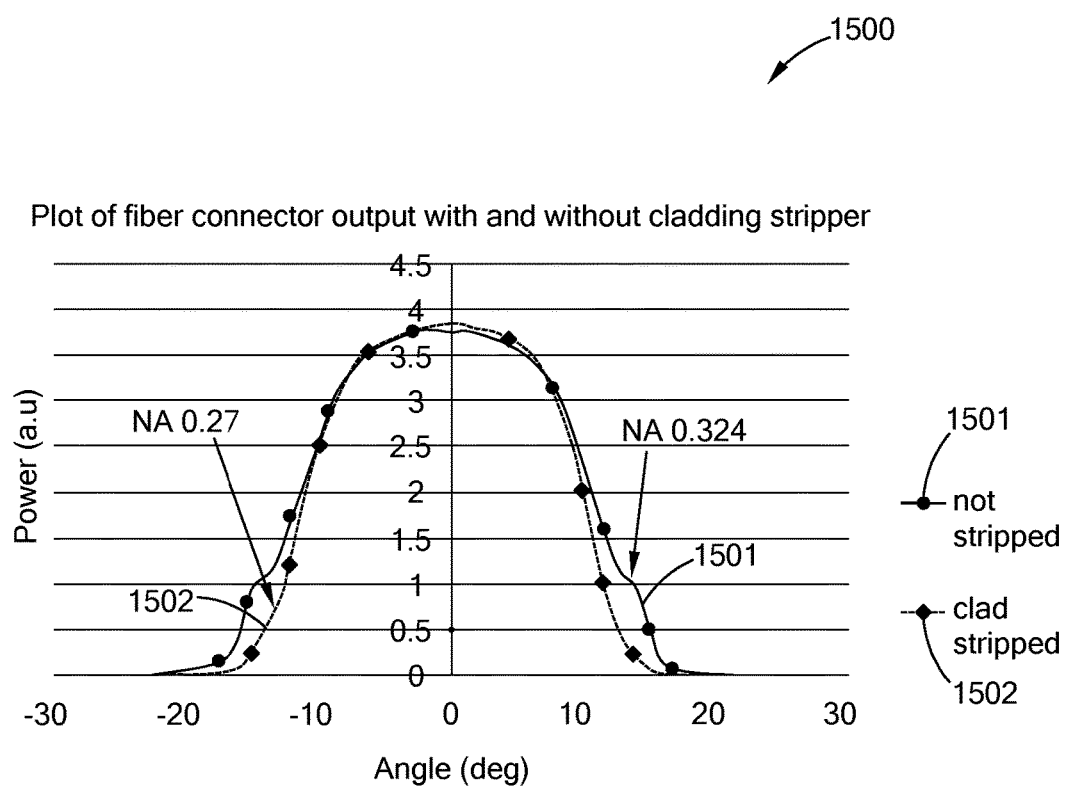
FIG. 10 is a graph illustrating the improved output of an embodiment of the mode strippers of the present invention.

FIG. 9 is schematic of an embodiment of a laser mode stripper 900. The laser mode stripper 900 has an incoming high power laser fiber 901 that enters block 904. The high power laser fiber transmits a high power laser beam along a laser beam path primarily in the core of the fiber, although laser power is, or can be, present in one or more of the claddings of the fiber. There is a glass tube 905 attached to block 905. The fiber 901 leaves block 903 and is within glass tube 905. The fiber is within an assembly 910, which has an frame 907, 908 (preferably invar to match the fiber thermal expansion), a heat management device 911, 912 and stripper assembly bars, e.g., 913, which hold the stripper material, e.g., 914, in optical contact with the fiber 901. The stripper material 914 is of the nanoparticle types disclosed and described in this specification. The stripper assembly bars transmit heat from the stripper material to the heat management device. The assembly can be passively cooled, liquid cooled and is more preferably air cooled with a flowing stream of air. The optical fiber 901 leaves the assembly 910, at which point (assuming the laser beam is being propagated in the direction of block 903 to block 904) the fiber will have no light, no laser power in the cladding (as represented by number 901a, i.e., a fiber free from clad power). The fiber 901a is in glass tube 906, which is attached to block 904.

It should be noted that back reflections traveling in the cladding of fiber 901a will be removed by the assembly 910, and thus the laser energy in fiber 901 will preferably be free from back reflections in the cladding layer.

The assembly 910 can be mounted in a spool, in a splice box, or within a down hole tool, by way of example. It can be located anywhere in a high power laser system, and anywhere along the laser beam path, where there is sufficient space to house and cool the assembly. Thus, they are capable of being located at or near any point in the system where there is a need to manage, reduce and preferably element the propagation of laser power (forward propagation, back reflection or both) in the cladding.

Thus, embodiments of the present mode strippers and moding stripping assemblies have several benefits. For example, and without limitation, these devices can protect down hole tool optics and splices from excessive power in the fiber outer cladding which has a higher NA. They can use bare fiber to expose the cladding to allow suitable materials to couple out cladding light and have that light removed as heat. They do not impact or effect the core of the optical fiber. They can use the processing fluid flow, e.g., tool gas flow, for cooling. They will improve the NA of fibers, and in particular improve the NA of high NA fibers.

The various embodiments of devices, mode strippers, systems, tools, activities and operations set forth in this specification may be used with various high power laser systems and conveyance structures and systems, in addition to those embodiments of the Figures and in this specification. The various embodiments of devices, mode strippers, systems, tools, activities and operations set forth in this specification may be used with: other high power laser systems that may be developed in the future: with existing non-high power laser systems, which may be modified, in-part, based on the teachings of this specification, to create a high power laser system; and with high power directed energy systems. Further, the various embodiments of devices, mode strippers, systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The inventions may be embodied in other forms than those specifically disclosed herein without departing from its spirit or essential characteristics. The described embodiments are to be considered in all respects only as illustrative and not restrictive.

What is claimed:

1. A high power laser mode stripper in optical communication with an optical fiber and in thermal communication with a heat sink, the mode stripper comprising:
   a. a carrier medium;
   b. the carrier medium being in direct physical contact and in optical contact with a cladding layer of an optical fiber;
   c. the carrier medium having an index of refraction and the outer cladding having an index of refraction; wherein the carrier medium index of refraction is matched to the cladding index of refraction, whereby light from the cladding will propagate into the carrier medium;
   d. the carrier medium holding a distribution of nano-particles, whereby the distribution of nano-particles is configured to effect the light propagated from the cladding into the carrier medium; and,
   e. the carrier medium is in thermal contact with a heat sink;
   f. whereby upon propagation of light from the cladding to the carrier medium, the nano-particles and carrier medium convert the light propagated from the cladding into heat which is transmitted by the carrier medium to the heat sink.

2. The mode stripper of claim 1, wherein the indices of refraction are matched to within about 5% of each other.

3. The mode stripper of claim 1, wherein the indices of refraction are matched to within about 2% of each other.

4. The mode stripper of claim 1, wherein the indices of refraction are matched to within about 1% of each other.

5. The mode stripper of claim 1, wherein the indices of refraction are matched to within about 0.1% of each other.

6. The mode stripper of claim 1, wherein the indices of refraction are the same.

7. The mode stripper of claim 1, wherein the carrier medium is selected from the group consisting of sodium silicate, fused silica, and spinel.

8. The mode stripper of claim 1, wherein the nano-particles have a D50 particle size of about 100 nm to 2000 nm.

9. The mode stripper of claim 1, wherein the nano-particles have a D50 particle size of about 10 nm to 2000 nm.

10. The mode stripper of claim 1, wherein the nano-particles are selected from the group consisting of silica, diamond, spinel, sapphire, and borosilicate glass.

11. The mode stripper of claim 1, wherein the effect on the light propagated from the cladding to the carrier material comprises scattering.

12. The mode stripper of claim 1, wherein the effect on the light propagated from the cladding to the carrier material comprises absorption.

13. The method of claim 1, wherein the nano-particles have a D50 particle size of about 100 nm to 2000 nm.

14. A high power laser mode stripper in optical communication with an optical fiber and in thermal communication with a heat sink, the mode stripper comprising:
   a. a carrier medium;
   b. the carrier medium being in direct physical contact and in optical contact with a cladding layer of an optical fiber;
   c. the carrier medium having an index of refraction and the outer cladding having an index of refraction; wherein the carrier medium index of refraction is matched to the cladding index of refraction, whereby light from the cladding will propagate into the carrier medium;
   d. the carrier medium holding a distribution of nano-particles, whereby the distribution of nano-particles is capable of absorbing and scattering the light propagated from the cladding into the carrier medium; and,
   e. the carrier medium is in thermal contact with a heat sink;
   f. whereby the nano-particles are capable of converting the light propagated from the cladding to the carrier medium to heat which is transmitted to the heat sink.

15. The mode stripper of claim 14, wherein at least about 50% of the light propagated from the cladding into the carrier medium is scattered by the nano-particles.

16. The mode stripper of claim 14, wherein at least about 80% of the light propagated from the cladding into the carrier medium is scattered by the nano-particles.

17. The mode stripper of claim 14, wherein about 5% to 20% of the light propagated from the cladding into the carrier medium is absorbed by the nano-particles.

18. The mode stripper of claim 14, wherein at least about 90% of the light propagated from the cladding into the carrier medium is scattered by the nano-particles.

19. The mode stripper of claim 14, wherein the nano-particles have a particle size of about 100 nm to about 2000 nm.

20. The mode stripper of claim 14, wherein the nano-particles have a particle size of about 500 nm to about 1500 nm.

21. The mode stripper of claim 14, wherein the nano-particles have a particle size of about 2000 nm and smaller.

* * * * *